(12) United States Patent
Abiru

(10) Patent No.: US 7,896,541 B2
(45) Date of Patent: Mar. 1, 2011

(54) MIXER AND MIXING METHOD OF MIXING POLYMER DOPE, AND SOLUTION CASTING APPARATUS AND PROCESS

(75) Inventor: Daisaku Abiru, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/233,451

(22) Filed: Sep. 18, 2008

(65) Prior Publication Data

US 2009/0079107 A1    Mar. 26, 2009

(30) Foreign Application Priority Data

Sep. 20, 2007   (JP)   ............................. 2007-243722

(51) Int. Cl.
*B01F 13/08*   (2006.01)
*B01F 5/06*    (2006.01)

(52) U.S. Cl. ..................... 366/273; 366/149; 366/181.5

(58) Field of Classification Search ................ 264/212, 264/216; 366/273–274, 342–343, 149, 181.5; 416/3; 435/302.1; 99/277.2; 417/420
See application file for complete search history.

(56) References Cited

U.S. PATENT DOCUMENTS

| | | | | |
|---|---|---|---|---|
| 4,068,830 A | * | 1/1978 | Gray | 366/175.2 |
| 4,382,684 A | * | 5/1983 | Hori | 366/167.1 |
| 4,408,890 A | * | 10/1983 | Beckmann | 366/155.2 |
| 4,441,823 A | * | 4/1984 | Power | 366/167.1 |
| 7,160,021 B2 | * | 1/2007 | Yamazaki et al. | 366/149 |
| 2005/0043444 A1 | * | 2/2005 | Ono et al. | 523/332 |
| 2008/0056064 A1 | | 3/2008 | Tanaka | |
| 2009/0079106 A1 | * | 3/2009 | Abiru | 264/216 |
| 2009/0079107 A1 | * | 3/2009 | Abiru | 264/216 |

FOREIGN PATENT DOCUMENTS

| | | | |
|---|---|---|---|
| JP | 3-181324 | * | 8/1991 |
| JP | 2006-76280 A | | 3/2006 |
| WO | 2006/016513 A1 | * | 2/2006 |

* cited by examiner

*Primary Examiner*—Charles E Cooley
(74) *Attorney, Agent, or Firm*—Birch, Stewart, Kolasch & Birch, LLP

(57) ABSTRACT

A mixer for mixing liquid additive with polymer dope constituted by cellulose ester as polymer and solvent is provided. There is a mixing conduit for flow of the polymer dope. A supply conduit ejects liquid additive into the polymer dope in the mixing conduit. A rotor hub is positioned downstream from the supply conduit, contained in the mixing conduit rotatably about an axis directed in a flow direction of the polymer dope, and has a diameter decreasing end on an upstream side. A driving device with electromagnets rotates the rotor hub by electromagnetic induction through a chamber inside the mixing conduit. Furthermore, a support is disposed within the mixing conduit to extend transversely to the flow direction, for supporting the rotor hub rotatably. Flow openings are formed in the support, for passing the polymer dope in the flow direction about the rotor hub.

18 Claims, 11 Drawing Sheets

MIXER AND MIXING METHOD OF MIXING POLYMER DOPE, AND SOLUTION CASTING APPARATUS AND PROCESS

BACKGROUND OF THE INVENTION

1. Field of the Invention

The present invention relates to a mixer and mixing method of mixing polymer dope, and a solution casting apparatus and process. More particularly, the present invention relates to a mixer and mixing method of mixing polymer dope with high efficiency even in a simple structure, and a solution casting apparatus and process.

2. Description Related to the Prior Art

Cellulose acylates are used as a support of polymer film contained in photosensitive materials, such as photographic films, owing to advantageous characteristics, for example rigidity, non-flammability, and the like. A typical example of cellulose acylate is cellulose triacetate (TAC) having an average acetylation degree of 57.5-62.5%. Also, the polymer film of the cellulose triacetate (TAC) is used as a protection film of a polarizing element, or an optical compensation film (view angle enlarging film or the like), any of those being incorporated in a liquid crystal display (LCD) panel. This is effective because of optically utilizing the highly isotropic property of the polymer film.

Typical examples of producing method for the polymer film include extrusion and solution casting. In the extrusion, polymer is heated and melted, and extruded by an extruder to produce the polymer film. The extrusion is characterized in high productivity and a low manufacturing cost. However, a thickness of the polymer film is difficult to adjust in the extrusion, which is not suitable for producing optical film due to occurrence of die lines on the polymer film. In the solution casting, polymer dope is used and constituted by polymer and a solvent. The polymer dope is cast on a casting support, and stripped from the support when a self-supporting property develops. The stripped self-supporting cast film is dried, and wound as the polymer film. The solution casting is capable of producing the polymer film with high isotropic property, with regularity in the thickness, and without foreign material in comparison with the extrusion. The solution casting is utilized specifically for producing the polymer film of optical use.

In general, additives are used additionally in the polymer dope for the solution casting and mixed with the polymer and the solvent. The use of the additives in the polymer dope is effective, because retardation control agents can adjust the optical performance. Flame retardants impart such important property to the polymer film as non-flammable property as important property. Release agents can be used for raising productivity in the course of manufacture.

To prepare the polymer dope for casting, liquid additive having the additives is mixed with the polymer dope as solution of the polymer in the solvent. Examples of mixing methods include in-line mixing and batch mixing or tank mixing. In the in-line mixing, the polymer dope is supplied through a flow line continuously to mix the additives with the polymer dope. In the batch mixing or tank mixing, the additives are mixed with the polymer dope stored in a tank. The in-line mixing is generally used in the solution casting for mixing the additives with the polymer dope.

Examples of mixers for the in-line mixing of liquid additive with the polymer dope include a dynamic mixer and a static mixer. The dynamic mixer includes a stirring blade for rotating. The static mixer mixes fluid without using such a movable element. In the dynamic mixer, a shaft for the stirring blade must be kept rotatable smoothly with suitable lubricant property. Also, the dynamic mixer requires a sealing property to prevent leakage of the polymer dope or the additives through a gap near to the shaft. It is known to use oil or lubricant as sealant for requirements of both of the lubricant property and sealing property. However, an ideal structure of satisfying the requirements at the same is extremely difficult to create. When the dynamic mixer is used, unwanted mixture of the lubricant is likely to occur with the polymer dope as foreign material at the time of stir. The contamination will result in lowering the suitability of the polymer film for shaping, and lowering the optical performance. In contrast, the static mixer can operate without such problem of contamination in the dynamic mixer, because of lack of a movable element.

Accordingly, the static mixer is used for mixing the additives with the polymer dope. U.S. Pat. Pub. No. 2008/056064 (corresponding to JP-A 2006-076280) discloses an example of the static mixer. A twisting type of static mixer includes twisted plates for mixing fluid by a flow in a curved passage in a flow line. A Sulzer mixer includes plural crossed plates combined to cross one another alternately, to split the fluid in plural flows in the flow line. The flowing fluid is split and moved in reverse in a repeated manner, to mix the additives with the polymer dope.

Recent development of the liquid crystal display panel is remarkable so that there are many new types of liquid crystal display panels, such as TN type, VA type and the like. The polymer film must be produced to have specifics suitable for the various types of liquid crystal display panels. Improvement related to the efficiency in producing the polymer film is an important concern to manufacturers of the polymer film.

However, a great number of the static mixer must be optimized at each time of a change in the polymer dope or composition of the additives typically in a system for manufacturing various types of polymer films. Efficiency in the manufacture of the polymer film will be lower due to complexity in operation for the optimization of mixing.

Various compounds are used as additive components in the liquid additive because of the increase in the number of types of optical films. An amount of addition of the additive components has been increased recently in comparison with the former period. It is very likely that the viscosity ratio between the dope and the liquid additive is higher, as the viscosity of the liquid additive is lower than that of conventional liquid additive. The liquid additive cannot be mixed sufficiently with the dope at a short time according the twisting or splitting of a conventional static mixer, due to the high viscosity ratio.

SUMMARY OF THE INVENTION

In view of the foregoing problems, an object of the present invention is to provide a mixer and mixing method of mixing polymer dope with high efficiency even in a simple structure, and a solution casting apparatus and process.

In order to achieve the above and other objects and advantages of this invention, a mixer for mixing liquid additive with polymer dope constituted by polymer and solvent includes a mixing conduit for flow of the polymer dope. A supply conduit ejects the liquid additive into the polymer dope in the mixing conduit. A rotor hub is positioned downstream from the supply conduit, contained in the mixing conduit rotatably about an axis directed in a flow direction of the polymer dope, and has a diameter decreasing end on an upstream side. A driving device rotates the rotor hub by electromagnetic induction through a chamber inside the mixing conduit.

Furthermore, a support is disposed within the mixing conduit to extend transversely to the flow direction, for supporting the rotor hub rotatably. A flow opening is formed in the support, for passing the polymer dope in the flow direction about the rotor hub.

The supply conduit has a distribution channel, opposed to the diameter decreasing end in the flow direction, for spreading the liquid additive transversely to the flow direction, to eject the liquid additive into the polymer dope.

Furthermore, an element for stir is formed with a peripheral surface of the rotor hub, and constituted by a groove or blade.

The driving device includes plural magnets incorporated in the rotor hub, and arranged with predetermined polarity relative to a circumferential direction. An electromagnet assembly is secured outside the mixing conduit and around the rotor hub, for generating a magnetic field, to rotate the rotor hub with the plural magnets.

The mixing conduit includes a jacket for maintaining temperature of the polymer dope at a level equal to or lower than a boiling point thereof.

The rotor hub is constituted by plural rotor hubs arranged serially along the mixing conduit in the flow direction, and the driving device is positioned to correspond to each of the rotor hubs.

A ratio $\eta d/\eta t$ of viscosity $\eta d$ of the polymer dope to viscosity $\eta t$ of the liquid additive is equal to or more than 1 and equal to or less than $1 \times 10^5$.

A ratio D1/D2 of an outer diameter D1 of the rotor hub to an inner diameter D2 of the mixing conduit is equal to or more than 0.1 and equal to or less than 0.95 as viewed on a plane perpendicular to the flow direction.

A ratio V1/V2 of a flow speed V1 of the polymer dope to a flow speed V2 of the liquid additive is equal to or more than 1 and equal to or less than 5 on the upstream side from the rotor hub and on a downstream side from the distribution channel.

A distance between an outlet of the supply conduit and the diameter decreasing end is equal to or more than 1 mm and equal to or less than 200 mm.

The rotor hub is driven to rotate at such a peripheral speed V3 as to set a Reynolds value Re higher than 0.02, where the Reynolds value Re is defined by an equation of:

$$Re = \Delta d \cdot V3 \cdot \rho k / \eta k$$

where $\eta k$ is viscosity of the polymer dope supplied with the liquid additive;

$\rho k$ is density of the polymer dope;

$\Delta d$ is a size of a gap between an inside of the mixing conduit and a peripheral surface of the rotor hub.

Also, a solution casting apparatus includes a mixing conduit for flow of polymer dope constituted by polymer and solvent. A supply conduit ejects liquid additive into the polymer dope in the mixing conduit. A rotor hub is positioned downstream from the supply conduit, contained in the mixing conduit rotatably about an axis directed in a flow direction of the polymer dope, and having a diameter decreasing end on an upstream side. A driving device rotates the rotor hub by electromagnetic induction through a chamber inside the mixing conduit. A casting die ejects casting dope obtained from the rotor hub by mixing the polymer dope and the liquid additive. A support moves continuously and forming cast film upon casting the casting dope thereon. A dryer dries the cast film stripped from the support.

Also, a solution casting process includes a step of feeding polymer dope constituted by polymer and solvent to flow through a mixing conduit. Liquid additive is ejected through a supply conduit into the polymer dope in the mixing conduit. The liquid additive is mixed with the polymer dope to obtain casting dope, by use of a rotor hub positioned downstream from the supply conduit, contained in the mixing conduit, having a diameter decreasing end on an upstream side, and rotated by electromagnetic induction about an axis directed in a flow direction of the polymer dope. The casting dope is cast on a support moving continuously, to form cast film. The cast film stripped from the support is dried.

The supply conduit has a distribution channel, opposed to the diameter decreasing end in the flow direction, for spreading the liquid additive transversely to the flow direction, to eject the liquid additive into the polymer dope.

Also, a mixing method of mixing liquid additive with polymer dope constituted by polymer and solvent is provided. The liquid additive is ejected through a supply conduit into the polymer dope in a mixing conduit. The liquid additive is mixed with the polymer dope by use of a rotor hub positioned downstream from the supply conduit, contained in the mixing conduit, having a diameter decreasing end on an upstream side, and rotated by electromagnetic induction about an axis directed in a flow direction of the polymer dope.

Consequently, polymer dope can be mixed with high efficiency even in a simple structure, because the hub shaped with a decreasing diameter can operate for tubularly directing and collecting the polymer dope with the liquid additive directly downstream from the supply conduit.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
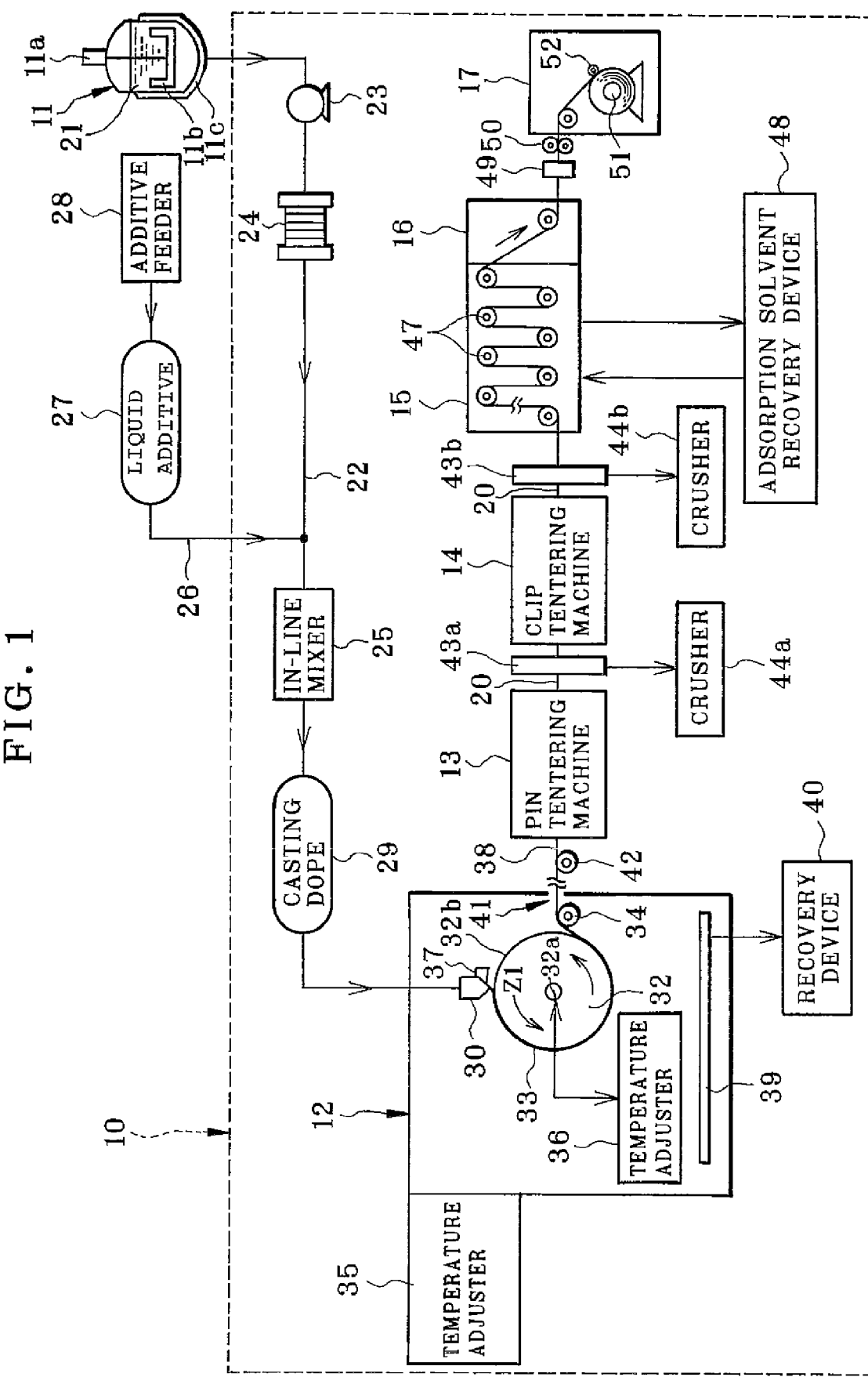
FIG. 1 is an explanatory view in flow diagram illustrating a solution casting system.

In FIG. 1, a solution casting apparatus or system 10 is illustrated. The solution casting apparatus or system 10 includes a storage tank 11, a casting chamber 12, a pin tentering machine 13, a clip tentering machine 14, a dryer 15 with a drying chamber, a cooler 16 with a cooling chamber, and a winding chamber 17.

The storage tank 11 includes a stirring blade 11b, a motor 11a for rotating the stirring blade 11b, and a jacket 11c. Polymer dope 21 is contained in the storage tank 11, and is constituted by solution of a polymer in solvent. The polymer is material to produce polymer film 20. The polymer dope 21 in the storage tank 11 is conditioned for a predetermined temperature by the jacket 11c. Rotation of the stirring blade 11b keeps quality of the polymer dope 21 uniform by suppressing aggregation of the polymer. A flow line 22 or conduit for the polymer dope 21 is installed to extend from the storage tank 11.

Various elements reside in the flow line 22, including a gear pump 23, a filtration device 24, and an in-line mixer 25 as rotor/stator device in a sequence of the flow. A liquid additive supply line 26 or conduit is disposed to join into the flow line 22 at a portion downstream from the filtration device 24. An additive feeder 28 is connected with the liquid additive supply line 26, and supplies liquid additive 27 to the flow line 22. A casting dope 29 is obtained from the polymer dope 21 and the liquid additive 27 by the in-line mixer 25. A casting die 30 is supplied with the casting dope 29.

The casting chamber 12 has the casting die 30, a casting drum 32, a stripping roller 34, temperature adjusters 35 and 36, and a decompressor 37 with a decompression chamber. The casting drum 32 is rotatable about a drum shaft 32a. A driving mechanism (not shown) drives the casting drum 32 to rotate in the direction Z1. The casting chamber 12 and the casting drum 32 are conditioned so as to facilitate gelation of a cast film 33 by adjustment with the temperature adjusters 35 and 36.

A support surface 32b of the casting drum 32 in rotation receives the polymer dope 21 ejected by the casting die 30. The cast film 33 is formed from the polymer dope 21 on the support surface 32b. While the casting drum 32 makes approximately a three fourths rotation, self-supporting property develops in the cast film 33 by gelation. A self-supporting cast film 38 is obtained when the stripping roller 34 strips the cast film 33 from the casting drum 32.

The decompressor 37 is disposed upstream from the casting die 30 with reference to the direction Z1. A rear surface of the bead of the polymer dope 21 is decompressed at a predetermined pressure, the rear surface being positioned to contact the support surface 32b of the casting drum 32. This is effective in reducing influence of entrained flow of gas in rotation of the casting drum 32. The cast film 33 with reduced unevenness can be formed by forming the bead between the casting die 30 and the casting drum 32.

A material for the casting die 30 is a substance having low thermal expansion and high resistance to corrosion in a liquid such as electrolytic aqueous solution, dichloromethane, methanol and other mixed solution. For precision of finish of the contact surface of the casting die 30 on the liquid, the contact surface preferably has a surface roughness equal to or less than 1 micron, and a straightness equal to or less than 1 micron per meter in each of various directions.

The support surface 32b of the casting drum 32 is plated with chrome plating and has sufficient strength and resistance to corrosion. The temperature adjuster 36 circulates a heat exchange medium in the casting drum 32 to keep the temperature of the support surface 32b at a predetermined level. The heat exchange medium is conditioned at the predetermined level of temperature, and flows in the flow path in the casting drum 32 to control the support surface 32b thermally.

The width of the casting drum 32 is not limited, but is preferably 1.1-2.0 times as great as a casting width of the dope. The material of the casting drum 32 is stainless steel, and preferably SUS 316 steel with sufficient strength and resistance to corrosion. The support surface 32b of the casting drum 32 is plated with chrome plating, preferably hard chrome plating with Vickers hardness Hv of 700 or more and a thickness of 2 microns or more.

A condenser 39 and a recovery device 40 are contained in the casting chamber 12. The condenser 39 condenses solvent gas into solvent of the liquid phase. The recovery device 40 withdraws and recovers the solvent condensed by the condenser 39. After the recovery, the solvent is reused to prepare dope.

A transition region 41 extends from the casting chamber 12, and is arranged with the pin tentering machine 13 and the clip tentering machine 14 in a sequence of the flow. Transport rollers 42 in the transition region 41 transport the self-supporting cast film 38 into the pin tentering machine 13. A great number of pin plates are incorporated in the pin tentering machine 13; are pierced in web edges of the self-supporting cast film 38 for support, and travel on their paths. Evaporative gas is blown to the self-supporting cast film 38 moved by the pin plates, so that the self-supporting cast film 38 is dried to become the polymer film 20.

The clip tentering machine 14 has a great number of tenter clips for clamping web edges of the polymer film 20 and for traveling on their paths for stretch. Evaporative gas is applied to the polymer film 20 transported by the tenter clips, for drying in the course of tentering in the transverse direction.

Edge slitters 43a and 43b are positioned downstream respectively from the pin tentering machine 13 and the clip tentering machine 14. The edge slitters 43a and 43b slit web edge portions of the polymer film 20. The web edge portions are blown with air toward crushers 44a and 44b, and crushed for reuse as raw material of dope.

A great number of dryer rollers 47 are arranged in the dryer 15, and transport the polymer film 20 in contact. An air conditioner (not shown) adjusts the temperature, humidity and the like of the atmosphere in the dryer 15, so that the polymer film 20 is dried by passing the dryer 15 in a conditioned state. An adsorption solvent recovery device 48 is connected with the dryer 15, and recovers the solvent from the polymer film 20 by adsorption.

The cooler 16 is positioned downstream from the dryer 15, and cools the polymer film 20 down to the room temperature. A static eliminator 49 or elimination bar is disposed downstream from the cooler 16, and eliminates static charge from the polymer film 20. Also, a knurling roller 50 is disposed downstream from the static eliminator 49, and knurls web edges of the polymer film 20. A winder 51 is contained in the winding chamber 17, and has a spindle and a press roller 52. The polymer film 20 is wound about the spindle in a roll form.

Figure 2:
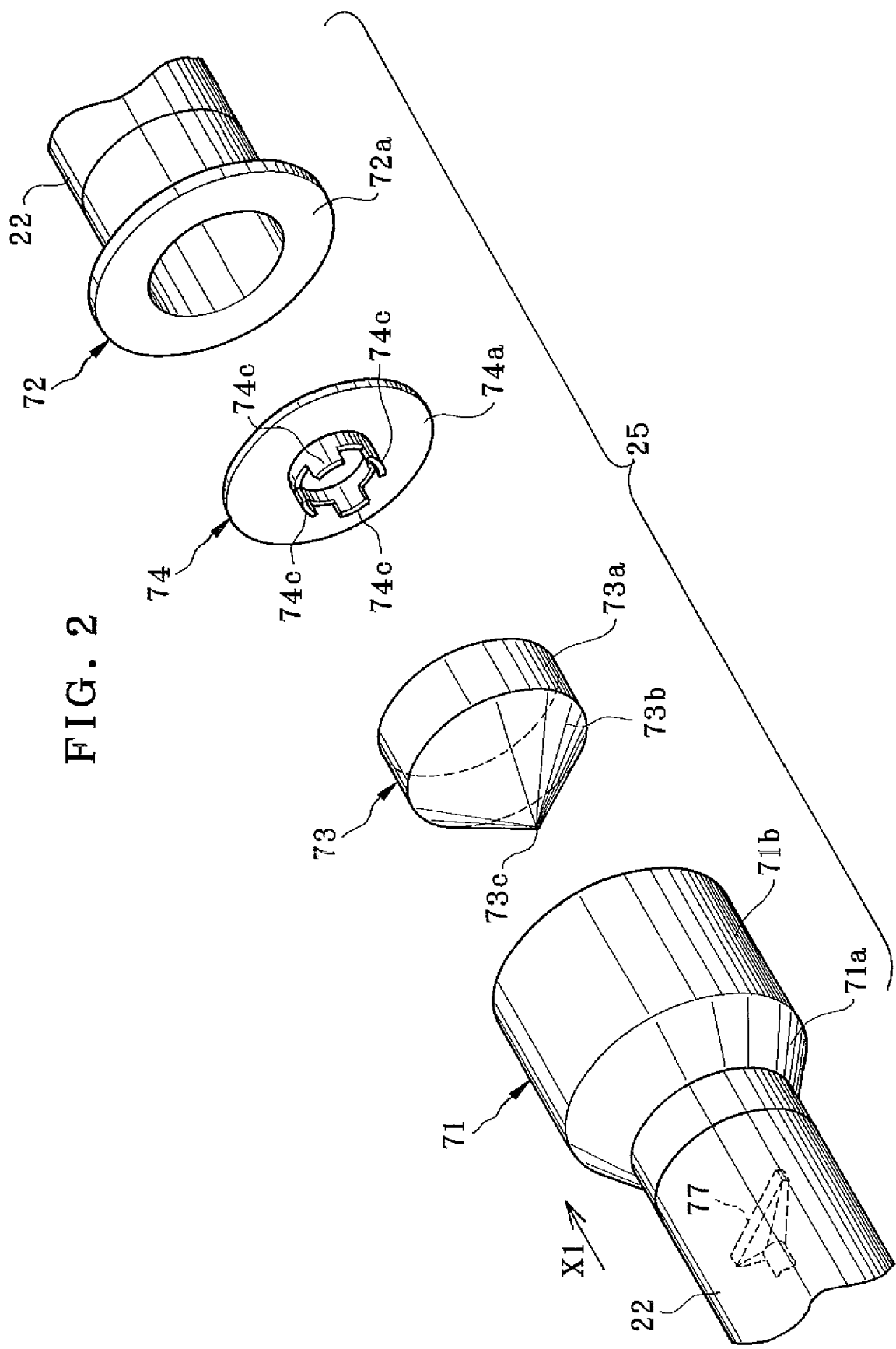
FIG. 2 is an exploded perspective view illustrating a in-line mixer.
Figure 3:
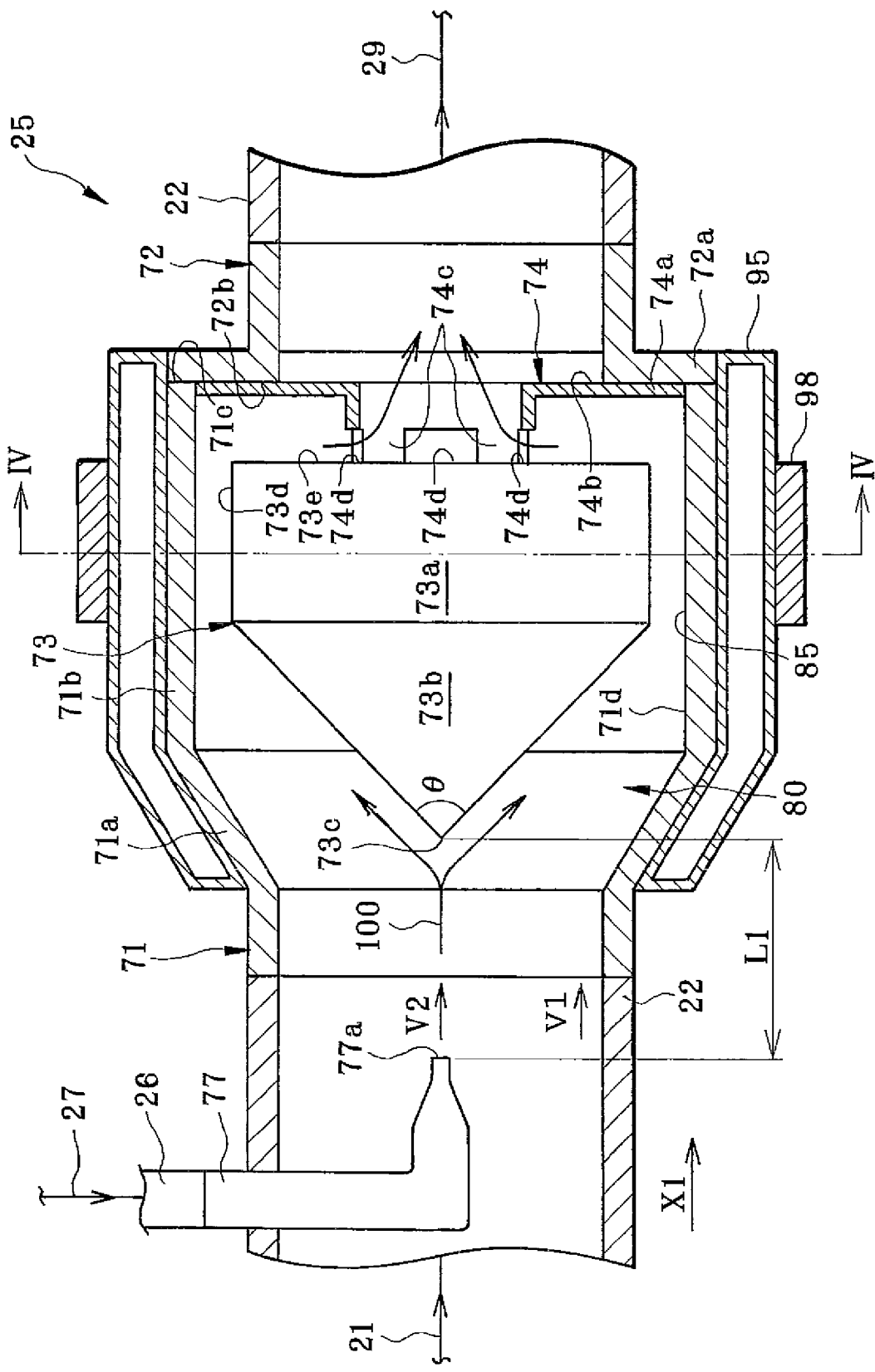
FIG. 3 is a vertical section taken on line III-III in FIG. 4 illustrating the in-line mixer.

In FIGS. 2 and 3, the in-line mixer 25 is illustrated. The in-line mixer 25 includes a first mixing conduit 71 as stator, a second mixing conduit 72 as stator, a rotor hub 73 or shear head, and a support 74.

An intermediate portion 71a and a cylindrical wall 71b are included in the first mixing conduit 71 and arranged in a flow direction X1 of the polymer dope 21. The intermediate portion 71a is connected with the flow line 22 by way of an inlet port. A nozzle shaped supply conduit 77 is disposed to extend through a side of the flow line 22, and is supplied by the additive feeder 28 with additives through the liquid additive supply line 26. An inner diameter of the cylindrical wall 71b is greater than that of the flow line 22. The intermediate portion 71a has a first inner diameter at its upstream end and equal to that of the flow line 22, and a second inner diameter at its downstream end and equal to that of the cylindrical wall 71b. The inner diameter of the intermediate portion 71a gradually increases in the flow direction toward the cylindrical wall 71b.

An inner diameter of the second mixing conduit 72 is set nearly equal to an inner diameter of the flow line 22. A flange 72a is formed at an upstream end of the second mixing conduit 72. An outer diameter of the flange 72a is set equal to an outer diameter of the cylindrical wall 71b of the first mixing conduit 71.

A downstream side 71c of the cylindrical wall 71b is set in contact with an upstream side 72b of the flange 72a to secure the second mixing conduit 72 to the first mixing conduit 71. Thus, a mixing chamber 80 is defined inside the mixing conduits 71 and 72.

A support flange 74a or disk projects from the support 74 at its downstream end. An outer diameter of the support flange 74a is slightly smaller than an inner diameter of the cylindrical wall 71b of the first mixing conduit 71. A downstream side 74b of the support flange 74a is disposed in contact with the upstream side 72b of the flange 72a. Four support projections 74c are formed on the support 74 to extend in the upstream direction. Flow openings 74d or outlet port is defined between the support projections 74c and is formed to communicate with the flow line 22.

The rotor hub 73 includes a hub body 73a and an inclined portion 73b. An outer diameter of the hub body 73a is smaller than an inner diameter of the cylindrical wall 71b, and is greater than an inner diameter of an upstream end of the support 74. The inclined portion 73b has a conical shape, and projects from the hub body 73a in the upstream direction. A pointed end 73c is formed with the inclined portion 73b and directed in the upstream direction X1. The rotor hub 73 is contained in the mixing chamber 80. A downstream end face 73e of the rotor hub 73 is supported by the support projections 74c. A peripheral surface 73d of the hub body 73a and the inclined portion 73b are kept spaced from an inner surface 71d of the first mixing conduit 71.

A flow space 85 is defined between the cylindrical wall 71b and the rotor hub 73 to communicate from the flow line 22 to the flow openings 74d. As viewed in a cross section on a plane vertical to the direction X1, the flow space 85 is in a ring shape. The flow space 85 has such a form that its cross sectional area S2 is smaller than a cross sectional area S1 of the flow line 22, and gradually decreases in the direction X1 between the first mixing conduit 71 and the rotor hub 73.

A conduit end portion is formed on the supply conduit 77. The conduit end portion extends flatly in the transverse direction of the flow line 22. A nozzle shaped distribution channel 77a is formed in the conduit end portion. As an outlet, the nozzle shaped distribution channel 77a is shaped to open as a slot directed in the transverse direction of the flow line 22.

The shape of the nozzle shaped distribution channel 77a is quadrilateral as viewed in a cross section. A size of the nozzle shaped distribution channel 77a is not limited and should be so large as to form a laminar flow of the liquid additive. In the embodiment, the nozzle shaped distribution channel 77a is so formed relative to the supply conduit 77 that its size in the vertical direction is equal to or smaller than that of the supply conduit 77, and that a size of the nozzle shaped distribution channel 77a in a horizontal direction transverse to the flow direction is greater than that of the supply conduit 77.

Figure 4:
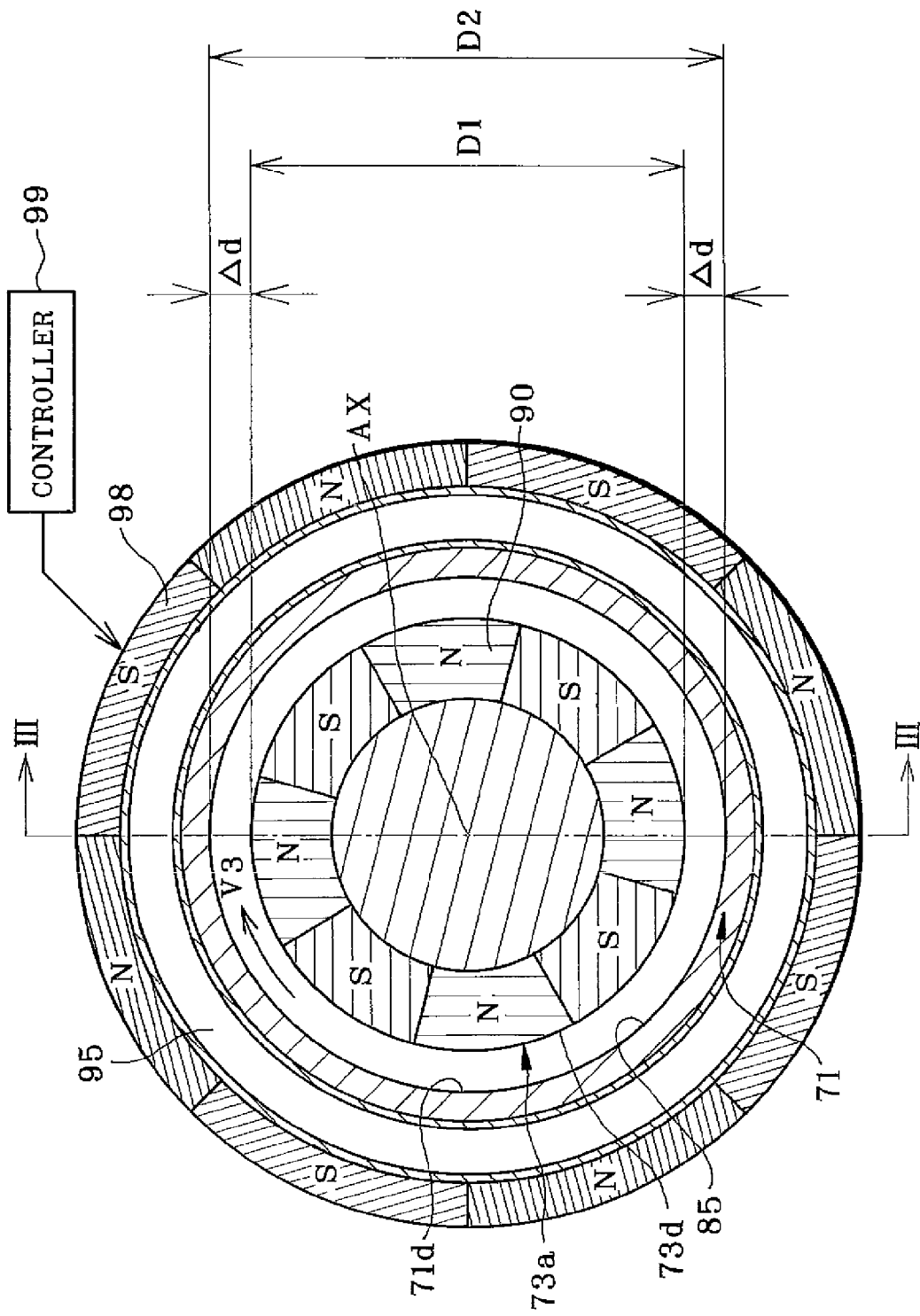
FIG. 4 is a cross section taken on line IV-IV in FIG. 3 illustrating the in-line mixer.

In FIG. 4, a magnet assembly 90 is incorporated in the hub body 73a. A plurality of magnets with different poles are arranged in the magnet assembly 90 and alternately in the circumferential direction of the peripheral surface 73d. A jacket 95 is disposed about the first mixing conduit 71. Heat exchange medium flows in the jacket 95 in a state conditioned at a predetermined temperature, to keep the polymer dope 21 and the liquid additive 27 maintained in a predetermined range of the temperature through the mixing chamber 80.

An electromagnet assembly 98 includes a great number of electromagnets arranged about the jacket 95. Each of the electromagnets includes a core of iron, windings positioned about the core, and a pair of lead wires. A controller 99 is connected by the lead wires to the windings in the electromagnet assembly 98. The controller 99 causes a current to flow in a predetermined direction in the lead wires in a conditioned manner, to generate a magnetic field with poles of the electromagnet assembly 98 about the jacket 95.

A preferable material of the first mixing conduit 71, the second mixing conduit 72 and the rotor hub 73 is stainless steel, with sufficient strength and resistance to corrosion in view of contact with the polymer dope 21 and the liquid additive 27.

A material for the support 74 is preferably a substance which does not require lubricant, and also with which no powder as dust will occur in friction with the rotor hub 73 in operation. Examples of the material for the support 74 are Teflon (trade name for tetrafluoroethylene), and various polymers.

A method of producing the polymer film 20 in the solution casting apparatus or system 10 is described now by referring to FIG. 1. In the storage tank 11, heat exchange medium is caused to flow in the jacket 11c to adjust the temperature of the polymer dope 21 at 25-35 deg. C. The stirring blade 11b rotates to stir the polymer dope 21 for a uniform state. The polymer dope 21 of a predetermined amount is supplied from the storage tank 11 by the gear pump 23 to the filtration device 24, and filtrated to remove impurity.

The additive feeder 28 supplies the polymer dope 21 with the liquid additive 27 after the filtration. The in-line mixer 25 obtains the casting dope 29 from the polymer dope 21 and the liquid additive 27. Thus, the casting dope 29 is supplied to the casting die 30.

An inner temperature of the casting chamber 12 is conditioned by the temperature adjuster 35 at a constant level in a range of 10-57 deg. C. Solvent gas, formed by gasifying from the polymer dope 21 or the cast film 33, disperses in the casting chamber 12. In the embodiment, the solvent gas is condensed and liquefied by the condenser 39 and recovered by the recovery device 40. The recovered solvent is refined by a refiner and reused as solvent for dope.

The casting drum 32 is caused to rotate about the drum shaft 32a by a driving mechanism. The support surface 32b moves in the direction Z1 at a constant speed of 50-200 meters per minute.

The polymer dope 21 is conditioned at a constant level of the temperature equal to or more than 30 deg. C. and equal to or less than 35 deg. C. The casting die 30 casts the polymer dope 21 on the support surface 32b of the casting drum 32, to form the cast film 33. The temperature adjuster 36 adjusts the support surface 32b at a constant level of the temperature equal to or more than −10 deg. C. and equal to or less than 10 deg. C. Thus, the cast film 33 on the support surface 32b is cooled and gelled, and comes to have a self-supporting property. In the course of cooling, gelation of the cast film 33 is promoted owing to forming crosslinking points as a basis of crystallization.

The stripping roller 34 strips the cast film 33 with self-supporting property from the casting drum 32 to obtain the self-supporting cast film 38. The transport rollers 42 transport the self-supporting cast film 38 to the pin tentering machine 13.

In the pin tentering machine 13, numerous pins operate to pierce in web edges of the self-supporting cast film 38. While the self-supporting cast film 38 is run, drying is promoted to obtain the polymer film 20. The polymer film 20, with solvent before complete evaporation, is transported into the clip tentering machine 14. In the clip tentering machine 14, web edges of the polymer film 20 are clamped by numerous tenter clips, and are dried and stretched.

The polymer film 20 transported out of the pin tentering machine 13 and the clip tentering machine 14 is slitted by the edge slitters 43a and 43b to remove web edges. The polymer film 20 runs through the dryer 15 and the cooler 16, and becomes wound by the winder 51 in the winding chamber 17. The web edges removed by the edge slitters 43a and 43b are crushed by the crushers 44a and 44b, and are reused as chips for preparing dope.

A web length of the polymer film 20 can be equal to or more than 100 meters in the casting direction. The polymer film 20 has a width equal to or more than 600 mm, and preferably can have a width equal to or more than 1,400 mm and equal to or less than 2,500 mm. The feature of the invention is effective also if the width is over 2,500 mm. The thickness of the polymer film 20 as a final product is not limited, but can be equal to or more than 20 microns and equal to or less than 80 microns.

Details of the in-line mixer 25 are described now. In FIG. 1, the gear pump 23 causes the polymer dope 21 to flow in the flow line 22 before the first mixing conduit 71 at a predetermined flow speed V1 downstream from the nozzle shaped distribution channel 77a. A pump (not shown) resides in the liquid additive supply line 26 or the additive feeder 28. The liquid additive 27 is supplied to the polymer dope 21 from the nozzle shaped distribution channel 77a of the supply conduit 77 at a flow speed V2 controlled by the pump. Premix solution 100 or first solution, obtained from the polymer dope 21 and the liquid additive 27, flows into the mixing chamber 80 through the flow line 22. The flow speed V1 is preferably equal to or more than 0.002 m/s and equal to or less than 0.06 m/s, and desirably equal to or more than 0.01 m/s and equal to or less than 0.05 m/s. The flow speed V2 is preferably equal to or more than 0.0003 m/s and equal to or less than 0.01 m/s, and desirably equal to or more than 0.0004 m/s and equal to or less than 0.002 m/s.

In FIGS. 3 and 4, the rotor hub 73 rotates about the axis AX while supported by the support 74 with attraction and repulsion between the pole of the magnet assembly 90 and the pole of the electromagnet assembly 98 controlled by the controller 99. The peripheral surface 73d on the rotor hub 73 moves round at the speed V3.

The rotor hub 73 is supported by the support projections 74c while rotated about the axis AX. The first solution 100 in the mixing chamber 80 passes the flow space 85 and the flow openings 74d and comes to flow in a downstream portion of the flow line 22 next to the second mixing conduit 72. The pointed end 73c of the inclined portion 73b on the rotor hub 73 divides or directs the first solution 100 in a radial direction from the center of the cross section as viewed in the direction X1. The first solution 100 from the pointed end 73c flows in the flow space 85 between the rotor hub 73 and the inner surface 71d. The peripheral surface 73d moves round to cause a shear flow of the first solution 100 in the flow space 85. The first solution 100 passed through the flow space 85 is collected together, and passes the flow openings 74d.

In the embodiment, the cross sectional area S2 of the flow space 85 decreases in the flow direction. The shear strain rate of the first solution 100 passing the flow space 85 increases, so that viscosity of the polymer dope 21 and the liquid additive 27 decreases in the flow space 85. Mixing of the liquid additive 27 with the polymer dope 21 is facilitated by shear flow of the first solution 100 in rotation of the peripheral surface 73d in the flow space 85. Also, the speed V3 of the peripheral surface 73d can be adjusted by the control of the controller 99 specifically if a characteristic of the polymer dope 21 or the liquid additive 27 changes according to a change in the composition. Consequently, it is possible in the invention to optimize the mixing condition according to the viscosity of the polymer dope 21 and the liquid additive 27 to facilitate preparation of the casting dope 29 of a uniform state.

According to the feature of the invention, there is no need of a shaft or other driving members requiring lubricant oil. A dynamic mixer can operate in easy optimization of mixing of the first solution 100. Unwanted mixing of lubricant or the like in the solution can be prevented, to eliminate a cause of degradation in view of optical performance of the polymer film.

It is preferable to condition the temperature of the first solution 100 in the flow space 85 in a predetermined range equal to or lower than the boiling point of the polymer dope 21 by use of the heat exchange medium for flow in the jacket 95. Foaming of the polymer dope 21 is suppressed in lowering the viscosity of the first solution 100 within the flow space 85. Thus, preparation of the casting dope 29 is further facilitated as uniform mixture of the polymer dope 21 and the liquid additive 27.

An angle defined by the shape of the pointed end 73c is preferably an acute angle for suppressing a loss in the pressure in the flow of the first solution 100. An angle θ of the pointed end 73c as viewed in the section on a plane containing the axis AX of the hub body 73a is preferably less than 80 degrees, in particular preferably 40-50 degrees, and desirably 45 degrees.

Let ηk be the viscosity of the first solution 100. Let ρk be density of the first solution 100. Let Δd be a clearance of the flow space 85. It is preferable that V1/V2 is equal to or more than 1 and equal to or less than 5, and a Reynolds value Re of the first solution 100 in the flow space 85 is equal to or more than 0.02. The Reynolds value Re of the first solution 100 in the flow space 85 can be desirably equal to or more than 0.1. Note that the Reynolds value Re is defined by the following equation.

$$Re = \Delta d \cdot V3 \cdot \rho k / \eta k$$

It is possible to mix the liquid additive 27 with the polymer dope 21 effectively only in case of satisfying the condition of the Reynolds value Re, irrespective of a laminar flow, turbulent flow or other states of flow of the first solution 100.

Note that viscosity, density and other characteristics of the first solution 100, the polymer dope 21 and the liquid additive 27 can be determined according to JIS K 7117, JIS K 7112 and the like.

In the in-line mixer 25, a ratio ηd/ηt of the viscosity ηd of the polymer dope 21 to the viscosity ηt of the liquid additive 27 may be set as desired without limitation, but can be preferably in a range equal to or more than 1 and equal to or less than $1 \times 10^5$.

A distance L1 from the pointed end 73c to the nozzle shaped distribution channel 77a of the supply conduit 77 is preferably equal to or more than 1 mm and equal to or less than 200 mm. Should the distance L1 be less than 1 mm, the rotor hub 73 is likely to interfere with the supply conduit 77 in an unwanted manner. Should the distance L1 be more than 200 mm, the liquid additive 27 from the supply conduit 77 is difficult to introduce to the pointed end 73c.

In the above embodiment, the shape of each of the mixing chamber 80 and the rotor hub 73 is defined with a greater width in its middle as viewed in the flow direction. However, the mixing chamber 80 and the rotor hub 73 according to the invention may have any suitable shape which can satisfy the condition of the cross sectional area S2 decreasing in the flow direction. A ratio S1/S2 of the cross sectional area S1 to the cross sectional area S2 is preferably equal to or more than 1.05 and equal to or less than 2. Should the ratio S1/S2 be more than 2, the shear strain rate will increase extraordinarily due to excessive loss of the pressure or influence of flow of extension, to cause difficulty in supply of the polymer dope 21 to the casting die 30. Should the ratio S1/S2 be less than 1.05, there occurs no drop in the viscosity of the polymer dope 21 and the liquid additive 27 in passage of the flow space 85.

Let D1 be an outer diameter of the hub body 73a as viewed on a plane perpendicular to the direction X1. Let D2 be an inner diameter of the inner surface 71d of the mixing chamber 80 as viewed on the same plane. It is preferable that the ratio D1/D2 is equal to or more than 0.1 and equal to or less than 0-95. Should the ratio D1/D2 be less than 0.1, sufficient stress of shear cannot be generated in the first solution 100. Should the ratio D1/D2 be more than 0.95, problems are likely to occur in that the rotor hub 73 may interfere with the inner surface 71d and unwanted lumps containing the additives may be created. Note that the value D1 may be defined to be equal to an outer diameter of the inclined portion 73b instead of the outer diameter of the hub body 73a.

In the above embodiment, the in-line mixer 25 is single. However, a plurality of in-line mixers 25 may be arranged serially in the flow direction X1 in the flow line 22. This is effective in mixing the liquid additive 27 with the polymer dope 21 to prepare the casting dope 29 in a reliably uniform manner.

In the above embodiment, the inner diameter of the cylindrical wall 71b is greater than that of the flow line 22. However, that inner diameter of the cylindrical wall 71b may be equal to or less than that of the flow line 22. The cross sectional area S2 of the flow space 85 should decrease gradually in the downstream direction inside the cylindrical wall 71b.

In the above embodiment, the axis AX of the rotor hub 73 extends in the flow direction X1. However, the axis AX may be directed eccentrically, or differently from the flow direction X1 in a condition of increasing the shear strain rate of the first solution 100. It is still preferable that the axis AX coincides with the flow direction X1 in view of mixing the whole of the first solution 100 adequately.

In the above embodiment, the axis of the form of the hub body 73a extends to coincide with the rotational axis of the rotor hub 73. However, those may not coincide with one another and can be eccentric. For example, the axis of the form of the hub body 73a may be different from and parallel with the rotational axis of the rotor hub 73.

Mixing of the liquid additive 27 with the polymer dope 21 is promoted specifically locally at a point of a decrease in the cross sectional area of the flow space 85, namely a decrease of the viscosity. Thus, it is preferable that a portion of the flow space 85 surrounded by the peripheral surface 73d and the inner surface 71d has a form extending long in the flow direction X1 of the first solution 100. For example, a portion of the flow space 85 surrounded by the peripheral surface 73d and the inner surface 71d can be preferably longer than a size of the inclined portion 73b.

In the above embodiment, the downstream end face 73e of the rotor hub 73 is supported by the support projections 74c. However, ring-shaped grooves or projections may be formed on the downstream end face 73e for guiding the support projections 74c.

Other preferred embodiments are hereinafter described. Elements similar to those of the above embodiment are designated with identical reference numerals.

Figure 5:
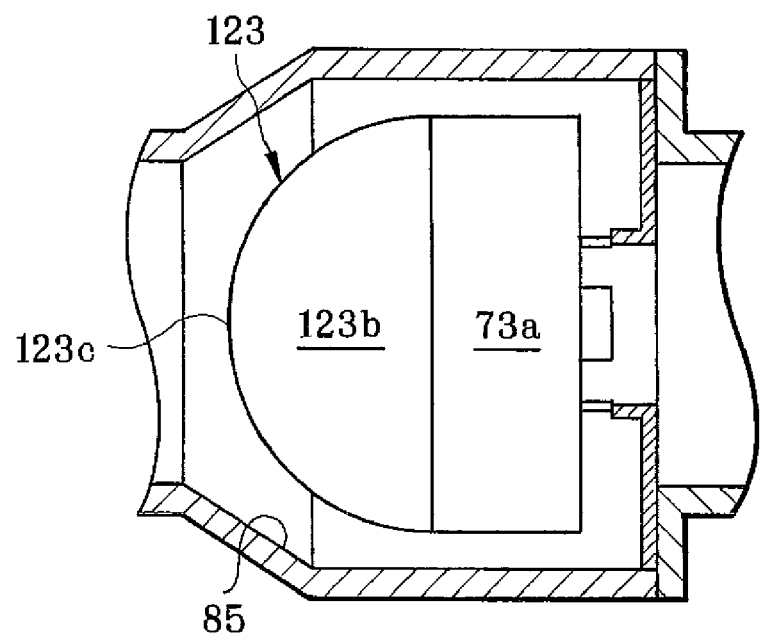
FIG. 5 is a vertical section illustrating another in-line mixer with a rotor hub having a diameter decreasing pointed end with a curve.

Various modifications of the structure for directing and supplying the polymer dope 21 toward the flow space 85 are possible in manners different from the use of the rotor hub 73 having the pointed end 73c. For example, a rotor hub can have a pointed end of an obtuse angle. In FIG. 5, one preferred rotor hub 123 is illustrated, including an inclined portion 123b positioned upstream from the hub body 73a, and a leading end 123c of the inclined portion 123b with a curved form.

Figure 6:
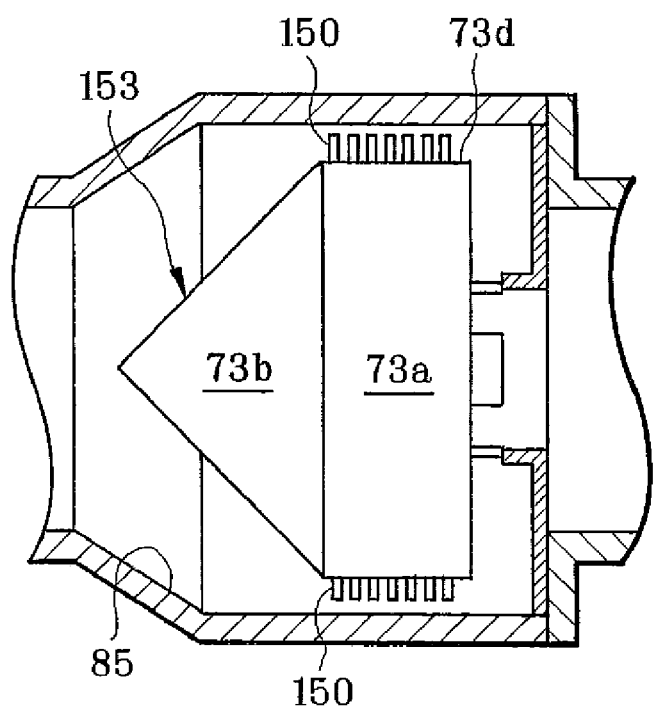
FIG. 6 is a vertical section illustrating one in-line mixer with an impeller hub.

In the above embodiment, the peripheral surface 73d rotates locally for a shear flow of the first solution 100. In FIG. 6, another preferred embodiment is illustrated. An impeller hub 153 or rotor hub or shear head is incorporated in an in-line mixer. Impeller blades 150 project from the peripheral surface 73d, and rotate to stir the first solution 100 passing the flow space 85. The liquid additive 27 can be mixed with the polymer dope 21 reliably by use of the impeller blades 150. Any type of various elements for stir can be formed on the peripheral surface 73d or the inner surface 71d in place of the impeller blades 150, the elements including rotor grooves, projections shaped in a twisted plate of a quadrilateral, projections in combination of plural plates crossed with one another, and the like. The form, number, pitch, arrangement and other condition of the impeller blades 150, projections or rotor grooves are not limited and can be determined suitably for the purpose.

Figure 7:
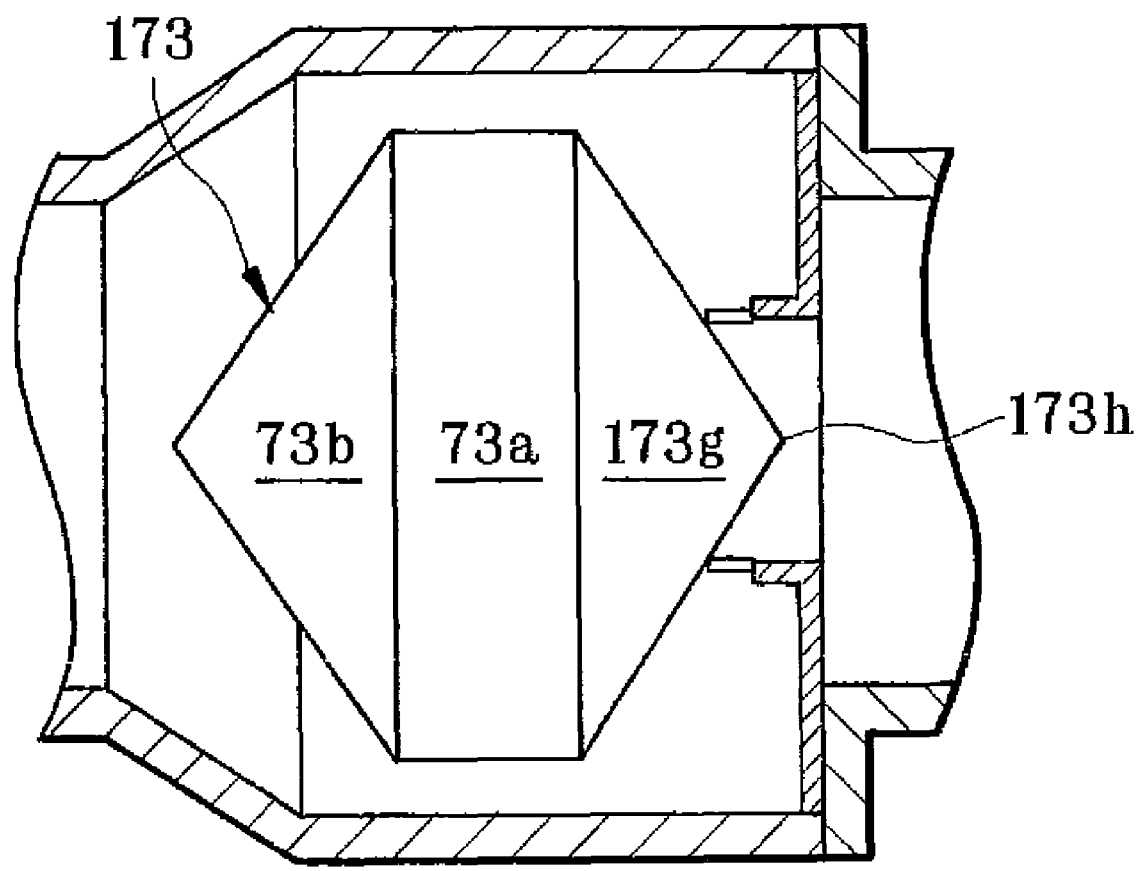
FIG. 7 is a vertical section illustrating still another in-line mixer with a rotor hub having a downstream pointed end.

In FIG. 7, one preferred rotor hub 173 is illustrated. An inclined portion 173g is disposed on a downstream side of the hub body 73a and projects with a pointed end 173h. The auxiliary pointed end 173h on the inclined portion 173g can have a form of an acute angle or obtuse angle. Also, a top of the end 173h may have a curved surface.

In the above embodiment, the magnet assembly 90 is disposed outside the jacket 95. However, a peripheral surface of the first mixing conduit 71 may be provided with the magnet assembly 90, and the jacket 95 may be disposed about the magnet assembly 90.

In the above embodiment, the rotor hub 73 is used dynamically to mix the liquid additive 27 with the polymer dope 21. Furthermore, it is possible in the invention to mix the liquid additive 27 with the polymer dope 21 statically. An in-line mixer 225 as static mixer is hereafter described.

Figure 8:
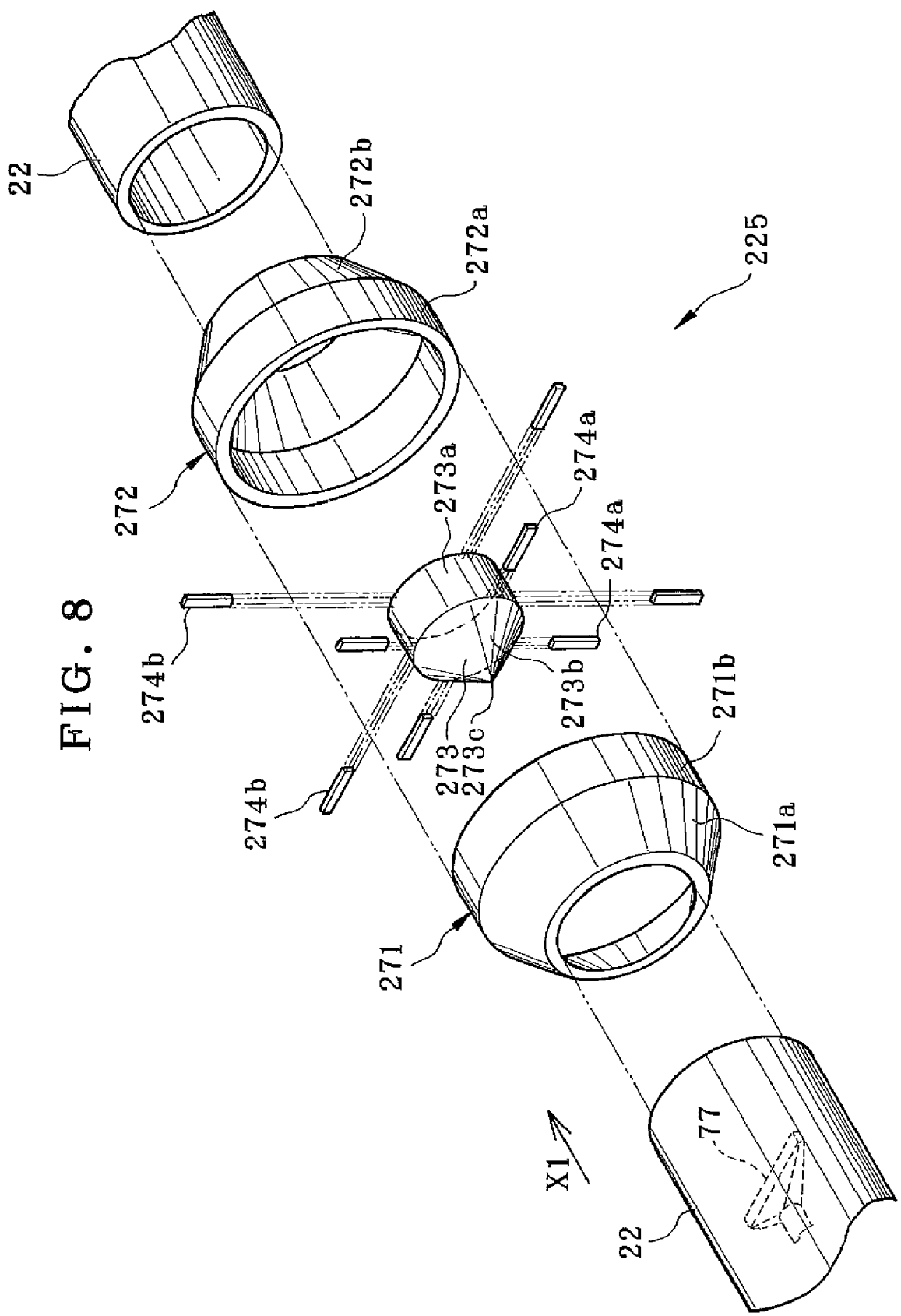
FIG. 8 is an exploded perspective view illustrating another preferred in-line mixer.
Figure 9:
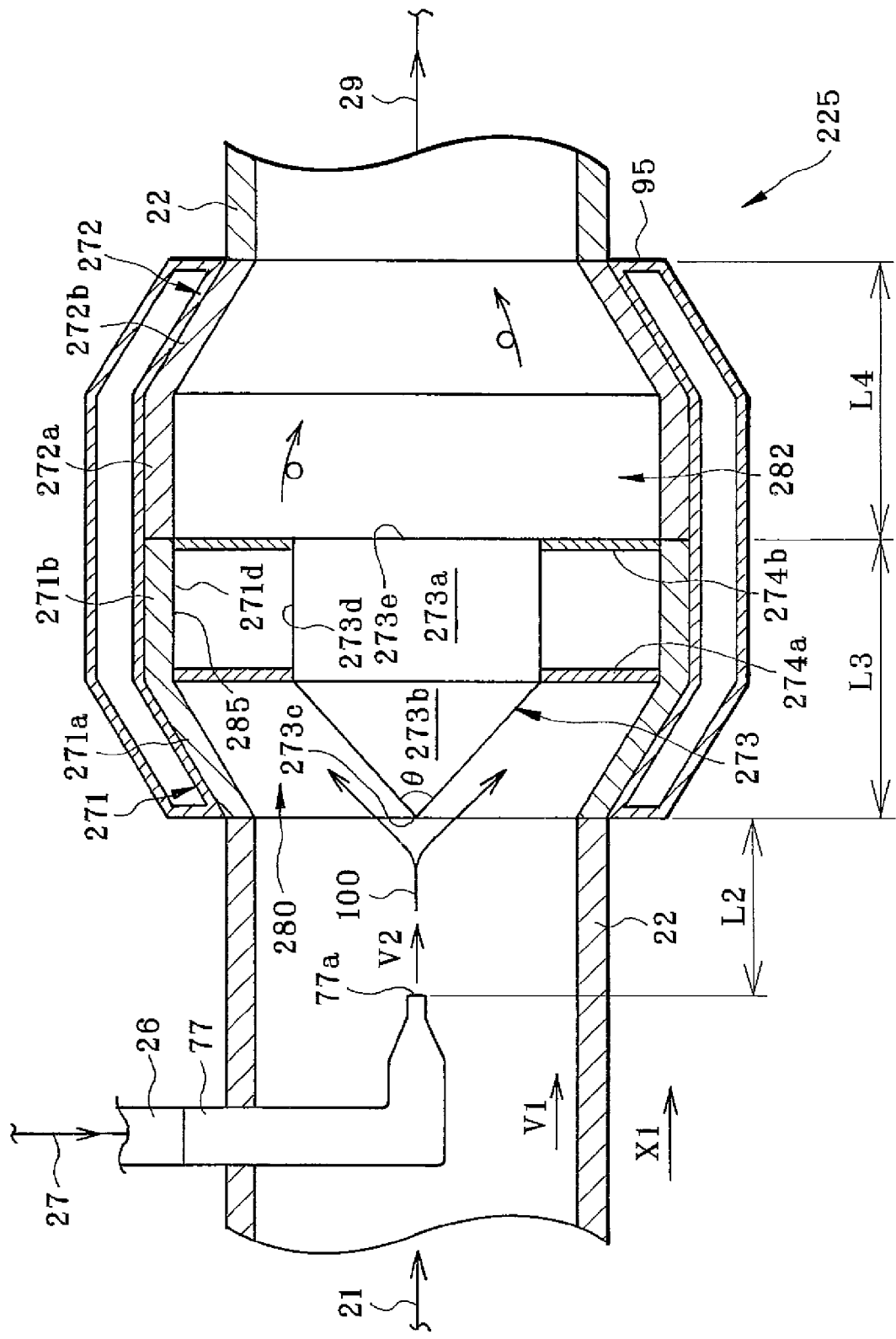
FIG. 9 is a vertical section illustrating the in-line mixer.

In FIGS. 8 and 9, the in-line mixer 225 includes a first mixing conduit 271, a second mixing conduit 272, a hub 273 or shear head, and supports 274a and 274b. The first mixing conduit 271 has a tubular shape, and includes an intermediate portion 271a and a cylindrical wall 271b arranged in the flow direction X1. The intermediate portion 271a is connected with the flow line 22 by way of an inlet port. The supply conduit 77 is positioned inside a portion of the flow line 22 upstream from the intermediate portion 271a.

An inner diameter of the cylindrical wall 271b is greater than that of the flow line 22. The intermediate portion 271a has a first inner diameter at its upstream end and equal to that of the flow line 22, and a second inner diameter at its downstream end and equal to that of the cylindrical wall 271b. The inner diameter of the intermediate portion 271a gradually increases in the flow direction toward the cylindrical wall 271b.

The second mixing conduit 272 has a tubular shape, and includes a cylindrical wall 272a and an intermediate portion 272b arranged in the flow direction X1. The intermediate portion 272b is connected with the flow line 22. An inner diameter of the cylindrical wall 272a is set equal to that of the cylindrical wall 271b. The intermediate portion 272b has a first inner diameter at its upstream end and equal to that of the cylindrical wall 272a, and a second inner diameter at its downstream end and equal to that of the flow line 22. The inner diameter of the intermediate portion 272b gradually decreases in the flow direction from the cylindrical wall 272a toward the flow line 22.

A mixing chamber 280 is defined inside the mixing conduits 271 and 272 by their connection in contact of the cylindrical wall 271b with the cylindrical wall 272a. The hub 273 is contained in the mixing chamber 280 inside the first mixing conduit 271. A collection flow path 282 is defined in the mixing chamber 280 inside the second mixing conduit 272.

The hub 273 includes a hub body 273a and an inclined portion 273b. An outer diameter of the hub body 273a is smaller than an inner diameter of the cylindrical wall 271b. The inclined portion 273b is formed to project from the hub body 273a. A pointed end 273c of the inclined portion 273b is in a conical shape, pointed with an acute angle, and directed upstream in the flow direction X1. A downstream end face 273e of the hub body 273a is oriented substantially perpendicular to the axis of the hub body 273a. A peripheral surface 273d of the hub 273 extends to the downstream end face 273e with a bend.

The supports 274a and 274b are four supports. An inner surface 271d of the first mixing conduit 271 is connected fixedly with the peripheral surface 273d by the supports 274a and 274b which extend from the peripheral surface 273d. The supports 274a and 274b keep the peripheral surface 273d spaced from the inner surface 271d in setting in the mixing chamber 280. A flow space 285, communicating from the flow line 22 to the collection flow path 282, is defined between the inner surface 271d and the hub 273 in a ring shape as viewed in a cross section on a plane perpendicular to the flow direction X1. A cross sectional area S4 of the flow space 285 on a plane perpendicular to the flow direction X1 is set equal to a cross sectional area S3 of the flow line 22. Also, the jacket 95 is disposed about the mixing conduits 271 and 272.

Details of the in-line mixer 225 are described now. The polymer dope 21 flows in the flow line 22 at the predetermined flow speed V1 by use of the gear pump 23 of FIG. 2. The additive feeder 28 supplies the liquid additive 27 to the polymer dope 21 at the flow speed V2 from the nozzle shaped distribution channel 77a in a manner spread in the transverse direction of the flow line 22.

The first solution 100 containing the polymer dope 21 and the liquid additive 27 is supplied by the flow line 22 to the mixing chamber 280. As the hub 273 is supported by the supports 274a and 274b with a gap inside the inner surface 271d, the first solution 100 in the mixing chamber 280 flows past the in-line mixer 225 through the flow space 285 and the collection flow path 282.

The pointed end 273c of the inclined portion 273b positioned upstream from the hub 273 directs the first solution 100 in the mixing chamber 280 in a radial direction from the center to the periphery as viewed in the cross section. The first solution 100 having passed the pointed end 273c flows through the flow space 285 in contact with the inner surface 271d and the peripheral surface 273d. The first solution 100 from the flow space 285 flows in the collection flow path 282. The collection flow path 282 collects the first solution 100 after being directed tubularly by the pointed end 273c. It is possible in the in-line mixer 225 to mix the liquid additive 27 in the polymer dope 21 through the tubular flow space of the first solution 100. In comparison with a well-known static mixer, the in-line mixer 225 can mix the liquid additive 27 efficiently with the polymer dope 21. The total number of a plurality of the in-line mixers 225 required for the polymer dope 21 in a uniform manner can be moderately low.

The form of the inclined portion 273b with the pointed end 273c is effective in suppressing a loss in the pressure to supply the flow space 285 with the first solution 100. Also, the cross sectional area S4 of the flow space 285 on a plane perpendicular to the flow direction X1 is equal to the cross sectional area S1 of the flow line 22, so that the first solution 100 can be directed and supplied in suppressing a loss in the pressure. A vortex can be created readily in the first solution 100 through the collection flow path 282, as the downstream end face 273e extends to the peripheral surface 273d with a curve. The vortex can cause ensured mixing of the liquid additive 27 with the polymer dope 21. Examples of the vortices are a twin vortex, Karman vortex and the like.

The temperature of the first solution 100 in the collection flow path 282 is adjusted and set at a constant level in a range equal to or lower than the boiling point of the polymer dope 21 by use of the heat exchange medium through the jacket 95. Mixing and preparation of the casting dope 29 from the polymer dope 21 and the liquid additive 27 can be further facilitated, because the viscosity of the first solution 100 through the collection flow path 282 can be lowered in suppressing foaming of the polymer dope 21.

In order to reduce the loss in the pressure, the angle θ of the pointed end 273c is determined preferably in an equal manner to that of the pointed end 73c of the in-line mixer 25. A viscosity ratio ηd/ηt between the polymer dope 21 and the liquid additive 27 is preferably equal to or more than 1 and equal to or less than $1 \times 10^5$, where ηd is a viscosity of the polymer dope 21 and ηt is a viscosity of the liquid additive 27.

A distance L2 from the pointed end 273c to the nozzle shaped distribution channel 77a of the supply conduit 77 is preferably equal to or more than 1 mm and equal to or less than 200 mm. Should the distance L2 be less than 1 mm, the rotor hub 73 may interfere with the supply conduit 77 to cause a problem. Should the distance L2 be more than 200 mm, difficulty arises in supply of the liquid additive 27 from the supply conduit 77 to the pointed end 73c.

Let L3 be a length from the pointed end 273c to the downstream end face 273e. Let L4 be a length of the collection flow path 282 between its upstream and downstream ends. The length L4 is preferably equal to or more than the length L3 for the purpose of ensuring mixing of the first solution 100 in the collection flow path 282.

In the above embodiment, the second mixing conduit 272 is originally separate from the first mixing conduit 271. However, a single mixing conduit constituted by the mixing conduits 271 and 272 may be used as one piece of metal.

In the above embodiment, collection of tubularly directed dope occurs in the collection flow path 282 in the second mixing conduit 272. However, the collection flow path 282 may be defined in a region downstream from the hub 273. The flow space 285 can be defined as a region directly between an inner surface of the mixing chamber 280 and the hub 273.

Figure 10:
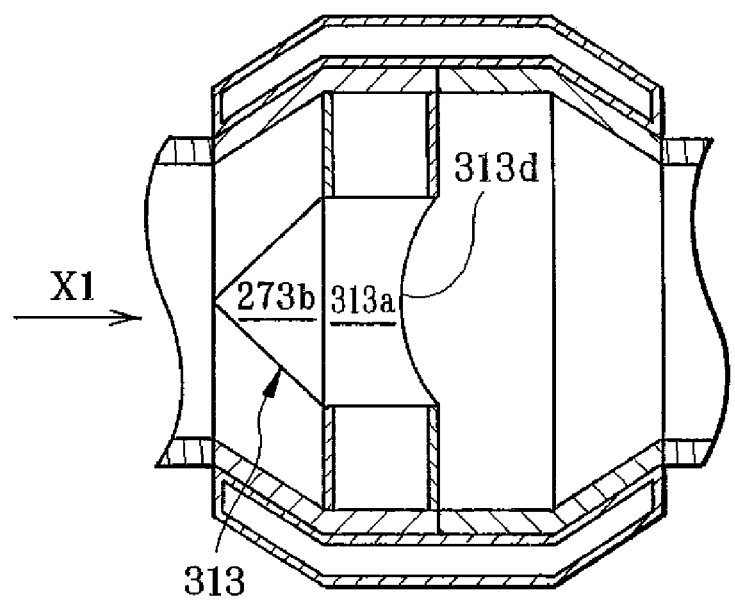
FIG. 10 is a vertical section illustrating one in-line mixer with a hub having a downstream end in a concave form.
Figure 11:
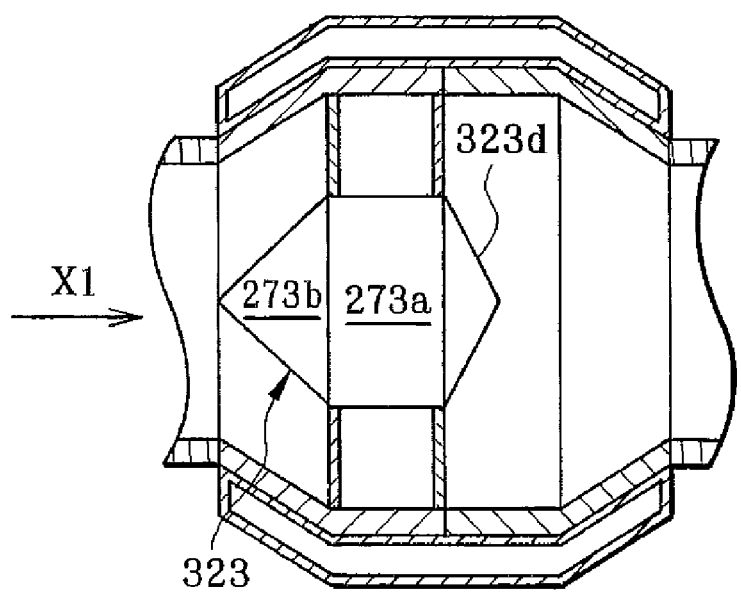
FIG. 11 is a vertical section illustrating another in-line mixer with a hub having a downstream pointed end.

A hub according to the invention may be structures differently from the hub 273 for the purpose of creating a vortex in the first solution 100 in the flow space 285 in contact with the peripheral surface 273d or the inner surface 271d. In FIG. 10, another preferred hub 313 or shear head is illustrated. There is a hub body 313a, on which a downstream end face 313d of the hub 313 has a concave form. In FIG. 11, one preferred hub 323 or shear head has a downstream end face 323d formed on the hub body 273a with a pointed end. A peripheral surface of the hub body 273a may extend to a downstream end face of a hub with a curve continuously, for example, a partially spherical surface.

Figure 12:
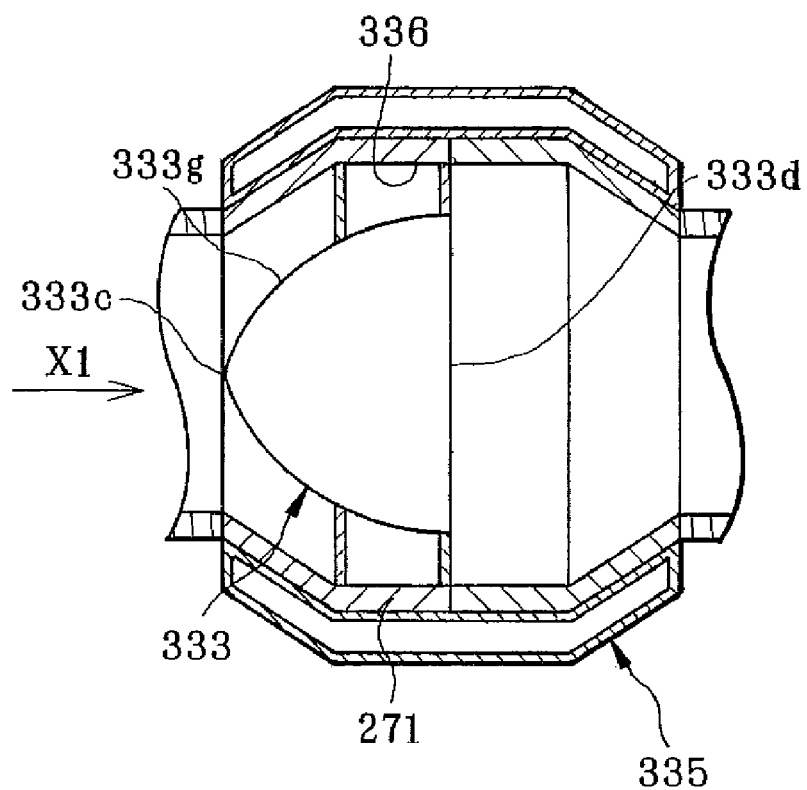
FIG. 12 is a vertical section illustrating one in-line mixer in which an area of a flow space about a hub decreases in a flow direction.

In FIG. 12, another preferred in-line mixer 335 as static mixer is illustrated. A hub 333 or shear head is contained in the in-line mixer 335. A flow space 336, defined between the hub 333 and the first mixing conduit 271, has a cross sectional area gradually decreasing in comparison with the flow line 22. The liquid additive 27 can be mixed with the polymer dope 21 efficiently, because viscosity of the polymer dope 21 or the liquid additive 27 is lowered in passage of the flow space 336 by an increase in the shear strain rate. The hub 333 includes a pointed end 333c, a downstream end face 333d, and an inclined surface 333g. The inclined surface 333g guides the first solution 100 toward the downstream end face 333d. Preferably, the inclined surface 333g is formed with a suitable curve in connection with the downstream end face 333d in the hub 333. Note that a hub lateral surface of the hub 333 contains straight lines from the pointed end 333c to the downstream end face 333d and also a plurality of curved lines on the pointed end 333c and the downstream end face 333d. The hub 333 with the inclined surface 333g as hub lateral surface is an element of directing the fluid according to the invention.

Figure 13:
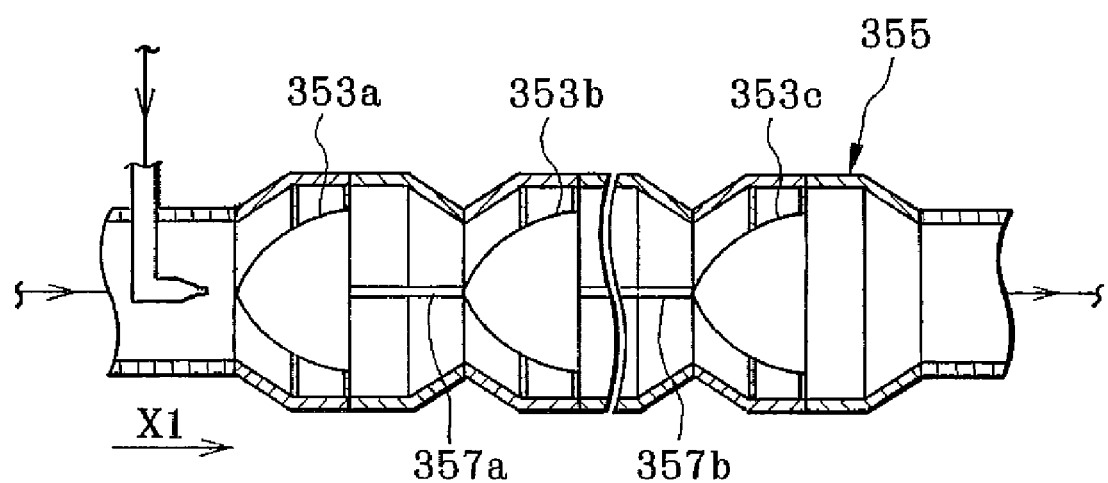
FIG. 13 is a vertical section illustrating a multi-stage mixer including plural hubs.

In the above embodiment, the hub is single. However, a plurality of mixers or hubs may be combined serially in the flow direction. In FIG. 13, a multi-stage mixer 355 as static mixer has first, second and third hubs 353a, 353b and 353c or shear heads each of which is structurally the same as the hub 333. Rod-shaped supports 357a and 357b support the second hub 353b on the first hub 353a and the third hub 353c on the second hub 353b. Also, the number of the hubs in the multi-stage mixer 355 may be two or four or more.

Figure 14:
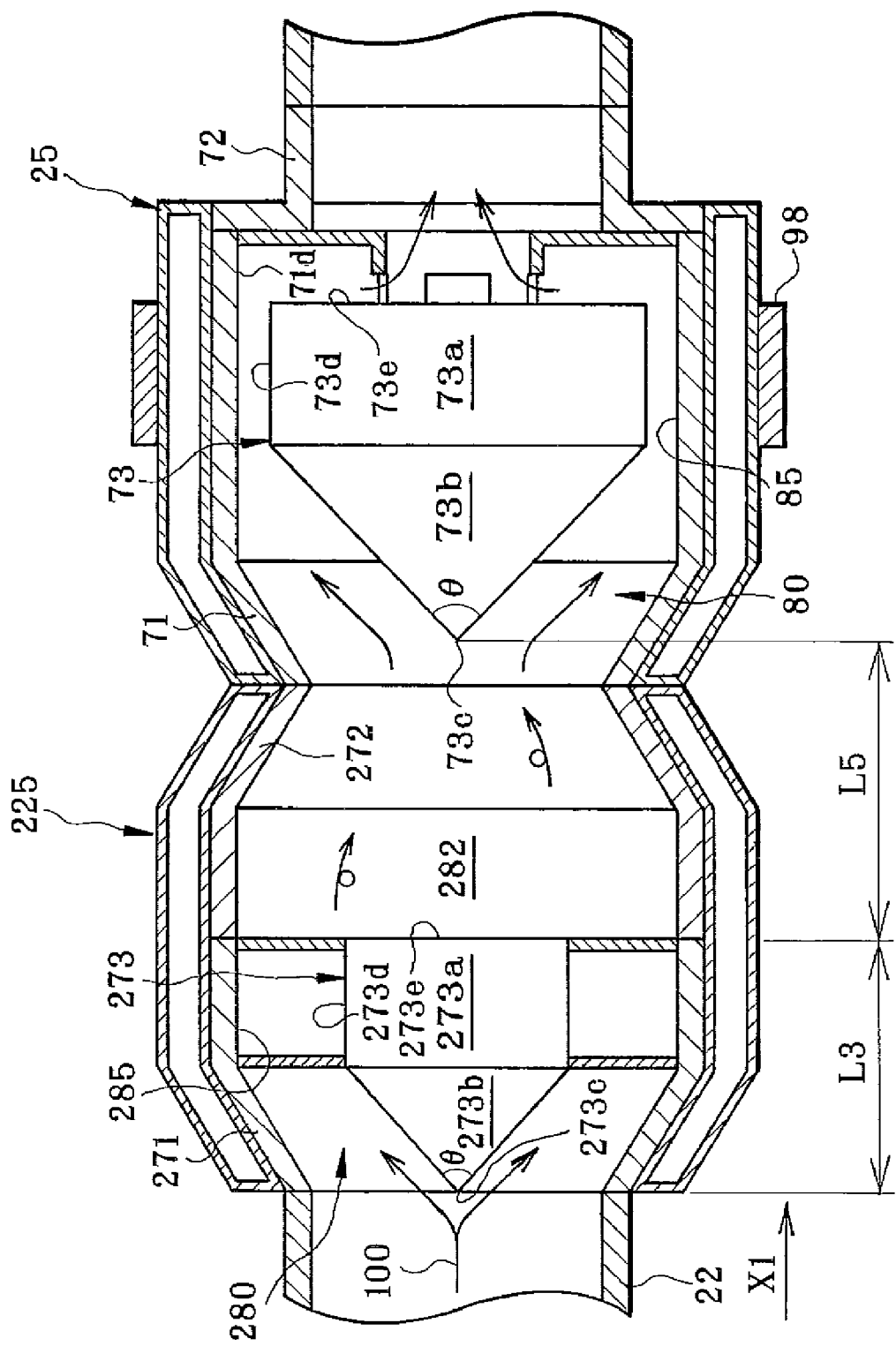
FIG. 14 is a vertical section illustrating a combination of two in-line mixers in series.

Furthermore, different types of the mixers may be combined and arranged particularly in a serial arrangement of the mixers or plural rotor hubs. For example, the in-line mixer 225 may be positioned upstream from the in-line mixer 25 as illustrated in FIG. 14. This is effective in splitting the first solution 100 before mixing in the in-line mixer 25 at the same time as mixing the liquid additive 27 with the polymer dope 21. A loss in the pressure of the pointed end 73c of the rotor hub 73 can be suppressed, to ensure mixing of the liquid additive 27 with the polymer dope 21. Also, let L3 be a distance from the pointed end 273c to the downstream end face 273e. Let L5 be a distance from the downstream end face 273e to the pointed end 73c located downstream from the hub 273. It is preferable that L5 is equal to or more than L3 in order to ensure mixing of the first solution 100 in the collection flow path 282.

In the above embodiment, the casting drum 32 is used. However, a support for casting may be an endless casting belt. Although the solution casting of the above embodiments is a method of a type of rapid casting, a polymer film producing process of the invention may be a solution casting method of a drying type, melt casting method, and the like.

Materials for preparing the polymer dope 21 in the invention, such as polymer solvent and additives, are hereinafter described.

[Polymer]

For polymer of the dope, cellulose esters can be preferably used, such as cellulose acylates. Specifically, triacetyl cellulose (TAC) is desirable. Preferably, 90 wt. % or more of the entirety of TAC should be particles of 0.1-4 mm.

Preferable examples of cellulose acylates satisfy all of the conditions I-III as follows for the purpose of high transparency:

$$2.5 \leq A+B \leq 3.0 \quad \text{I}$$

$$0 \leq A \leq 3.0 \quad \text{II}$$

$$0 \leq B \leq 2.9 \quad \text{III}$$

where A and B represent a degree of substitution of an acyl group (—CO—R) formed by substituting hydroxy groups in cellulose. A represents a degree of substitution of an acetyl group (—CO—CH$_3$) formed by substituting hydroxy groups in cellulose. B represents a total degree of substitution of acyl groups having 3-22 carbon atoms.

The cellulose is constructed by glucose units making a beta-1,4 bond, and each glucose unit has a liberated hydroxy group at 2, 3 and 6-positions. Cellulose acylate is a polymer in which part or whole of the hydroxy groups are esterified so that the hydrogen is substituted by acyl groups having two or more carbon atoms. The degree of substitution for the acyl groups in cellulose acylate is a degree of esterification at 2, 3 or 6-position in cellulose. Accordingly, when 100% of the hydroxy group at the same position is substituted, the degree of substitution at this position is 1.

The total degree of substitution DS2+DS3+DS6 for the acyl groups at the second, third or sixth positions is in the range of 2.00-3.00, preferably 2.22-2.90, and in particular preferably 2.40-2.88. Further, a ratio DS6/(DS2+DS3+DS6) is preferably 0.28 or more, and particularly 0.30 or more, and especially in the range of 0.31-0.34. The sign DS2 is a degree of substitution for the acyl groups at 2-position in hydroxy groups in the glucose unit. The signs DS3 and DS6 are degrees of substitution for the acyl groups at respectively 3 and 6-positions in hydroxy groups in the glucose unit.

An acyl group of only one example may be contained in the cellulose acylate of the invention. However, cellulose acylate may contain acyl groups of two or more examples. If two or more acyl groups are contained, one of the plural acyl groups should be preferably an acetyl group. Let DSA be a total degree of substitution for the acetyl groups. Let DSB be a total degree of substitution for other acyl groups at 2, 3 and 6-positions than the acetyl groups. The value DSA+DSB is preferably in the range of 2.22-2.90, and particularly in the range of 2.40-2.88. Further, the DSB is preferably at least 0.30, and especially at least 0.70. Furthermore, the percentage of a substituent at 6-position in the DSB is preferably at least 20%, preferably at least 25%, especially at least 30% and most especially at least 33% Further, the value DSA+DSB at 6-position is at least 0.75, preferably at least 0.80, and especially at least 0.85. Cellulose acylate satisfying the above conditions can be used to prepare a solution or polymer dope having a preferable solubility. Especially, chlorine-free type organic solvent can be preferably used to prepare adequate polymer dope. Also, the polymer dope can be prepared to have a low viscosity, high solubility, and the suitability for filtration becomes higher.

To obtain cellulose to produce cellulose acylates, any one of linter cotton and pulp cotton may be used.

Examples of acyl groups in cellulose acylates having two or more carbon atoms can be aliphatic groups, aryl groups, and the like. For example, cellulose acylates may be alkyl carbonyl esters, alkenyl carbonyl esters, aromatic carbonyl esters, aromatic alkyl carbonyl esters, and the like of cellulose, and can further contain a substitution group. Preferable examples of groups include: propionyl, butanoyl, pentanoyl, hexanoyl, octanoyl, decanoyl, dodecanoyl, tridecanoyl, tetradecanoyl, hexadecanoyl, octadecanoyl, iso-butanoyl, tert-butanoyl, cyclohexane carbonyl, oleoyl, benzoyl, naphthyl carbonyl, and cinnamoyl. Among those, particularly preferable groups are propionyl, butanoyl, dodecanoyl, octadecanoyl, tert-butanoyl, oleoyl, benzoyl, naphthyl carbonyl, and cinnamoyl. Further, specifically preferable groups are propionyl and butanoyl.

[Solvent]

Solvent as raw material of polymer dope is preferably an organic compound in which polymer is soluble. Examples of solvents for preparing the polymer dope include:

aromatic hydrocarbons, such as benzene and toluene;

halogenated hydrocarbons, such as dichloromethane and chlorobenzene;

alcohols, such as methanol, ethanol, n-propanol, n-butanol, and diethylene glycol;

ketones, such as acetone and methyl ethyl ketone;

esters, such as methyl acetate, ethyl acetate, and propyl acetate;

ethers, such as tetrahydrofuran and methyl cellosolve.

The term of polymer dope in the invention is used as mixture obtained by dissolution or dispersion of polymer in a solvent.

Halogenated hydrocarbons containing 1-7 carbon atoms are preferably used, for example, dichloromethane. Specifically, it is preferable in a mixed solvent to mix one or more alcohols containing 1-5 carbon atoms with the dichloromethane, for the purpose of high solubility, easy separability from a support for casting, mechanical strength of film material, and various optical characteristics of cellulose triacetate (TAC). Such alcohols are contained in the mixed solvent preferably in a range of 2-25 wt. %, and desirably in a range of 5-20 wt. %. Preferable examples of alcohols are methanol, ethanol, n-propanol, isopropanol, n-butanol and the like. Among those, specifically preferable alcohols are methanol, ethanol, n-butanol, and mixture of two or more of them.

Solvents not containing dichloromethane are effectively used in the publicly suggested requirement, for the purpose of minimizing influence to environment. Examples of compounds useful to this end are ethers having 4-12 carbon atoms, ketones having 3-12 carbon atoms, esters having 3-12 carbon atoms, and alcohols having 1-12 carbon atoms. Those can be mixed for use. For example, methyl acetate, acetone, ethanol, n-butanol and the like can be used in mixed solvent. Ethers, ketones, esters and alcohols of the examples may have a cyclic structure. Compounds having two or more functional groups of —O—, —CO—, —COO— and —OH, namely groups of ethers, ketones, esters and alcohols can be used as a solvent.

Details of cellulose acylates are according to various relevant techniques suggested in JP-A 2005-104148. Those examples and their various features can be used in the present invention.

I. Specific Examples of Cellulose Acylates

Suggested in JP A 57-182737 (corresponding to U.S. Pat. No. 4,499,043), JP A 10-45803 (corresponding to U.S. Pat. No. 5,856,468), JP A 11-269304 (corresponding to U.S. Pat. No. 6,139,785), JP A 8-231761, JP A10-60170, JPA9-40792, JPA11-5851, JPA9-90101, JPA4-277530, JP A 11-292989, JP A 2000-131524, and JP A 2000-137115.

II. Specific Examples of Solvents for Esters and Their Dissolution

Suggested in JP A 10-324774, JP A 8-152514, JP A 10-330538, JP A 9-95538 (corresponding to U.S. Pat. No. 5,663,310), JP A 9-95557 (corresponding to U.S. Pat. No. 5,705,632), JPA10-235664 (corresponding to U.S. Pat. No. 6,036,913), JP A 2000-63534, JP A 11-21379, JP A 10-182853, JP A 10-278056, JP A 10-279702, JP A 10-323853 (corresponding to U.S. Pat. No. 6,036,913), JP A 10-237186, JP A 11-60807, JP A 11-152342, JPA11-292988, JPA11-60752, JPA2000-95876, and JPA2000-95877.

Uses of various materials in relation to the polymer have been suggested in JP-A 2005-104148, including solvents, plasticizers, deterioration inhibitors, ultraviolet (UV) absorbers, lubricants, stripping accelerators, optical anisotropy control agents, retardation control agents, dyes, mat agents, release agents, and other additives.

I. Plasticizers

Suggested in JP A 4-227941, JP A 5-194788, JP A 60-250053, JP A 6-16869, JP A 5-271471, JP A 7-286068, JP A 5-5047 (corresponding to U.S. Pat. No. 5,279,659)7 JP A 11-80381, JP A 7-20317, JP A 8-57879, JP A 10-152568, and JP A 10-120824.

II. Deterioration Inhibitors and UV Absorbers

Suggested in JP A 60-235852, JP A 3-199201, JP A 5-190707, JP A 5-194789, JP A 5-197073, JP A 5-271471, JP A 6-107854, JP A6-118233, JPA 6-148430, JPA7-11055, JPA7-11056, JPA8-29619, JPA8-239509 (corresponding to U.S. Pat. No. 5,806,834), JPA2000-204173, and JP A 2000-193821.

Density of cellulose triacetate (TAC) in the polymer dope 21 is equal to or more than 5 wt. % and equal to or less than 40 wt. %, preferably equal to or more than 15 wt. % and equal to or less than 30 wt. %, and desirably equal to or more than 17 wt. % and equal to or less than 25 wt. %. Viscosity of the polymer dope 21 is equal to or more than 20 Pa·s and equal to or less than 200 Pa·s, and preferably equal to or more than 30 Pa·s and equal to or less than 100 Pa·s.

In the polymer dope production from cellulose triacetate, various techniques suggested in JP-A 2005-104148 for dissolution of materials and additives, filtration, elimination of bubbles, mixing of additives can be used.

No. 1. Dissolution Related to Casting

Suggested in JPA 9-95544 (corresponding to U.S. Pat. No. 5,663,310), JP A 10-45950, JP A 10-95854 (corresponding to U.S. Pat. No. 5,783,121), and JP A 2000-53784.

No. 2. Specific Preparing Methods of Solutions

Suggested in JP A 11-310640 (corresponding to U.S. Pat. No. 6,211,358), JP A 11-323017, JP A 11-302388, and JP A 2000-273184.

No. 3. Condensation of Solutions

Suggested in JPA 4-259511; U.S. Pat. No. 2,541,012, U.S. Pat. No. 2,858,229, U.S. Pat. No. 4,414,341, and U.S. Pat. No. 4,504,355.

[Additives]

The liquid additive 27, as solution, dispersion or the like, contains a plurality of additive components and a solvent for various uses. Examples of the additive components include stripping accelerators, plasticizers, ultraviolet (UV) absorbers, deterioration inhibitors, fine particles, optical performance control agents, and the like. The solvent is preferably the same composition as that contained in the polymer dope 21. Viscosity of the liquid additive 27 is equal to or more than $8 \times 10^{-4}$ Pa·s and equal to or less than 0.1 Pa·s, and preferably equal to or more than $1 \times 10^{-3}$ Pa·s and equal to or less than 0.05 Pa·s.

[Casting Dope]

The casting dope 29 is prepared by use of the polymer dope 21 and the liquid additive 27 described heretofore. Density of the liquid additive 27 in the casting dope 29 is in a preferable range equal to or more than 1 wt. % and equal to or less than 20 wt. % in 100 wt. % of the solid content of the casting dope 29.

In the invention, polymer film cast by a solution casting apparatus and process may have a multi-layer structure. To this end, casting may be a co-casting type, a successive co-casting type, or the like. Also, both of those can be combined. Examples of a die for the co-casting type are a casting die with a feed block, a multi-manifold die, and the like. In the polymer film with plural layers, at least one of a skin layer (air side) and a core layer (support side) can have a preferable thickness being 0.5-30% as great as the thickness of the entirety of the polymer film. In the co-casting, edge portions of a bead of the high viscosity dope are preferably enveloped by edge portions of a bead of the low viscosity dope in the course of a flow from the casting die slot to a support for casting. Also, in the co-casting, a ratio of the alcohol in the polymer dope for the skin layer (air side) is preferably higher than a ratio of the alcohol in the polymer dope for the core layer (support side) in a bead from the casting die slot to a support for casting.

Also, polymers for use in the invention may be various examples other than cellulose acylates or cellulose acetates, for example, cellulose alkylates, cellulose acetate propionate (CAP), cellulose acetate butylate (CAB), polyethylene terephthalate (PET), polyethylene, and the like. For use of such examples, the temperature of the polymer film 20 described in the above embodiments can be determined according to various factors including glass transition temperature Tg of the polymer, molecular interaction, and the like.

Various methods suggested in JP-A 2005-104148 are usable in combination with the casting of the invention, the methods including construction of the casting die, decompression chamber, support and other mechanical elements, co-casting, stripping, stretching, conditioning for drying in respective steps, polymer film handling, winding after eliminating a curl for flatness, solvent collection and polymer film collection. Those can be used in the present invention.

A. Support of Metal for Solution Casting

Suggested in JP A 2000-84960, U.S. Pat. No. 2,336,310, U.S. Pat. No. 2,367,503, U.S. Pat. No. 2,492,078, U.S. Pat. No. 2,492,977, U.S. Pat. No. 2,492,978, U.S. Pat. No. 2,607,704, U.S. Pat. No. 2,739,069, U.S. Pat. No. 2,739,070, GB A 640731 (corresponding to U.S. Pat. No. 2,492,977), GB A 735892, JP B 45-4554, JP B 49-5614, JP A 60-176834, JP A 60-203430, and JP A 62-115035.

B. Co-Casting

Suggested in JP B 62-43846; JP A 61-158414, JP A 1-122419, JP B 60-27562, JP A 61-94724, JP A 61-947245, JP A 61-104813, JP A 61-158413, JP A 6-134933; JP A 56-162617; JP A 61-94724, JP A 61-94725, and LP A 11-198285.

C. Specific Methods of Casting of Cellulose Esters

Suggested in JP A 61-94724, JP A 61-148013, JP A 4-85011 (corresponding to U.S. Pat. No. 5,188,788), JPA 4-286611, JPA 5-185443, JP A 5-185445, JP A 6-278149, and JP A 8-207210.

D. Stretching

Suggested in JP A 62-115035, JP A 4-152125, JP A 4-284211, JP A 4-298310, and JP A 11-48271.

E. Specific Methods of Drying

Suggested in JPA8-134336, JPA8-259706, and JPA8-325388.

F. Drying of Specific Controls of Heat

Suggested in JP A 04-001009 (corresponding to U.S. Pat. No. 5,152,947), JP A 62-046626, JP A 04-286611, and JP A 2000-002809.

G. Drying in Preventing Wrinkles

Suggested in JP A 11-123732, JP A 11-138568, and JP A 2000-176950.

Examples of the invention are hereinafter described. Among those, Examples 1-4 are according to the feature of the invention. Comparative examples 1-3 have been made for comparison with Examples 1-4. Example 1 will be described in detail. Portions of Examples 2-4 and Comparative examples 1-3 the same as those of Example 1 are not described because of repetition.

Example 1

Preparation of Polymer Dope

The following were solute (solid content) to prepare the polymer dope 21.

| | |
|---|---|
| Cellulose triacetate | 89.3 parts by weight |
| Plasticizer A | 7.1 parts by weight |
| Plasticizer B | 3.6 parts by weight |

The cellulose triacetate had substitution degree of 2.8. The plasticizer A was triphenylphosphate. The plasticizer B was biphenyl diphenylphosphate. The following were components of mixed solvent for the polymer dope 21.

| | |
|---|---|
| Dichloromethane | 80 parts by weight |
| Methanol | 13.5 parts by weight |
| n-butanol | 6.5 parts by weight |

The solute was added to the solvent, which was stirred and mixed to prepare the polymer dope 21. The polymer dope 21 was adjusted to have density of cellulose triacetate of approximately 23 wt. %. The polymer dope 21 was passed through and filtered by a filter paper #63LB (trade name, manufactured by Toyo Roshi Kaisha, Ltd.), then through a sintered metal filter 06N (manufactured by Nippon Seisen Co., Ltd.) having a nominal pore diameter of 10 microns, and furthermore through a mesh filter. The polymer dope 21 was stored in the storage tank 11. The polymer dope 21 of the composition according to the above list is herein referred to as polymer dope A. The polymer dope A had viscosity of 100 Pa·s.

[Cellulose Triacetate]

In the cellulose triacetate (TAC), an amount of the residual acetic acid was 0.1 wt. % or less. The TAC contained 58 ppm of Ca, 42 ppm of Mg, 0.5 ppm of Fe, 40 ppm of the free acid content of acetic acid, and 15 ppm of sulfur ion. In the TAC, a degree of acetyl substitution of 6-position was 0.91. A ratio of the acetyl group of the substitution of 6-position relative to all of the acyl groups was 32.5%. In the TAC, an extracted amount of acetone was 8 wt. %. A ratio of the weight average molecular weight to the number average molecular weight was 2.5. In the TAC, the yellow index was 1.7. The haze was 0.08. A factor of transparency was 93.5%. Raw material of cellulose for the TAC was fibrous material collected from cotton. The TAC herein will be referred to as cotton-derived TAC.

[Preparation of Additives]

The following were components of mixed solvent for the additives.

| Dichloromethane | 80 parts by weight |
|---|---|
| Methanol | 13.5 parts by weight |
| n-butanol | 6.5 parts by weight |

The additives were added to the solvent, and stirred and mixed to obtain the liquid additive 27. Viscosity of the liquid additive 27 was 0.001 Pa·s.

The casting dope 29 was produced in the solution casting apparatus or system 10. The polymer dope A in the storage tank 11 was supplied by the gear pump 23 to the flow line 22 at a volumetric flow rate Q1. The additive feeder 28 fed the solution casting system 10 with the liquid additive 27 at a volumetric flow rate Q2. The supply conduit 77 supplied the liquid additive 27 to the flow line 22. The first solution 100 containing the polymer dope A and the liquid additive 27 was supplied to the in-line mixer 25. The flow rate Q1 was 45 liters per minute. The flow rate Q2 was 0.3 liter per minute. The in-line mixer 25 rotated the rotor hub 73 with the traveling speed V3 of the peripheral surface $73d$ to set the Reynolds value Re in the above-described equation equal to 0.02. So the first solution 100 passing the flow space 85 was caused to flow finely, to obtain the casting dope 29.

Example 2

Preparation of Polymer Dope

The following were solute (solid content) to prepare the polymer dope 21.

| Cellulose triacetate | 89.3 parts by weight |
|---|---|
| Plasticizer A | 7.1 parts by weight |
| Plasticizer B | 3.6 parts by weight |

The cellulose triacetate had substitution degree of 2.8. The following were components of mixed solvent for the polymer dope 21.

| Dichloromethane | 80 parts by weight |
|---|---|
| Methanol | 13.5 parts by weight |
| n-butanol | 6.5 parts by weight |

The solute was added to the solvent, which was stirred and mixed to prepare the polymer dope 21. The polymer dope 21 was passed through and filtered by a filter paper #63LB (trade name, manufactured by Toyo Roshi Kaisha, Ltd.), then through a sintered metal filter 06N (manufactured by Nippon Seisen Co., Ltd.) having a nominal pore diameter of 10 microns, and furthermore through a mesh filter. The polymer dope 21 was stored in the storage tank 11. The polymer dope 21 of the composition according to the above list is herein referred to as polymer dope B. The polymer dope B had viscosity of 50 Pa·s.

For the in-line mixer 25, Example 1 was repeated. The casting dope 29 was obtained by mixing the polymer dope B and the liquid additive 27.

Example 3

Example 1 was repeated with a difference in that three in-line mixers 25 were arranged in series and resided in the flow line 22. The casting dope 29 was prepared from the polymer dope A and the liquid additive 27.

Example 4

Example 1 was repeated with a difference in that the in-line mixer 225 was provided in the flow line 22 and that two of the in-line mixers 25 were serially connected on a downstream side of the in-line mixer 225. The casting dope 29 was formed from the polymer dope A and the liquid additive 27.

Comparative Examples 1-3

Examples 1-3 were repeated respectively with a difference in which one or more well-known static mixers 6-N16-22 (6) -1 (trade name, manufactured by Noritake Co., Ltd.) were used in place of the in-line mixer 25 or 225.

[Evaluation of the Casting Dope]

The prepared casting dope was observed by human eyes and evaluated. The following were grades of the evaluation.

A: The liquid additive 27 was found uniformly mixed in the polymer dope.

B: The liquid additive 27 was found mixed in the polymer dope.

F: The liquid additive 27 was not found mixed in the polymer dope.

In Table 1, results of experiments conducted for the Examples and Comparative examples are indicated. The static mixer was constituted by the in-line mixer 225 of the embodiment. The at least one dynamic mixer was constituted by the in-line mixer 25. The results include the type and number of the static mixer, the type and number of the at least one dynamic mixer, the flow rate Q1 of the polymer dope, the viscosity ηd of the polymer dope, the flow rate Q2 of the liquid additive, the viscosity ηt of the liquid additive, and evaluation of the casting dope. The inner widths of the flow line 22 and the liquid additive supply line 26 were so determined that a ratio V1/V2 between the flow speeds V1 and V2 of the polymer dope and liquid additive was equal to 3. Among the signs in the table, A designates any one of the static mixer and at least one dynamic mixer of the invention. B designates the well-known static mixer, 6-N16-22 (6) -1 (trade name, manufactured by Noritake Co., Ltd.).

TABLE 1

| | Example 1 | Example 2 | Comparative example 1 | Comparative example 2 |
|---|---|---|---|---|
| Type of static mixers | — | — | — | — |
| No. of static mixers | 0 | 0 | 0 | 0 |
| Type of dynamic mixers | A | A | B | B |
| No. of dynamic mixers | 1 | 1 | 1 | 1 |
| Q1 (liters per min.) | 45 | 45 | 45 | 45 |
| ηd (Pa · s) | 100 | 50 | 100 | 50 |
| Q2 (liters per min.) | 0.3 | 0.3 | 0.3 | 0.3 |
| ηt (Pa · s) | 0.001 | 0.001 | 0.001 | 0.001 |
| Evaluation | B | B | F | F |

| | Example 3 | Comparative example 3 | Example 4 |
|---|---|---|---|
| Type of static mixers | — | — | A |
| No. of static mixers | 0 | 0 | 1 |
| Type of dynamic mixers | A | B | A |

TABLE 1-continued

| No. of dynamic mixers | 3 | 3 | 2 |
|---|---|---|---|
| Q1 (liters per min.) | 45 | 45 | 45 |
| ηd (Pa·s) | 100 | 100 | 100 |
| Q2 (liters per min.) | 0.3 | 0.3 | 0.3 |
| ηt (Pa·s) | 0.001 | 0.001 | 0.001 |
| Evaluation | A | F | B |

As a result, the casting dope 29 of a uniform quality was obtained according to Examples 1-4. In contrast, no casting dope 29 of a uniform quality was obtained according to Comparative examples 1-3. It is concluded that the casting dope 29 with high uniformity can be obtained easily by mixing the liquid additive 27 with the polymer dope 21 with high efficiency according to the invention.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A mixing method of mixing liquid additive with polymer dope constituted by polymer and solvent, comprising steps of:
    ejecting said liquid additive through a supply conduit into said polymer dope in a mixing conduit; and
    mixing said liquid additive with said polymer dope by use of a rotor hub positioned downstream from said supply conduit, contained in said mixing conduit, having a diameter decreasing end on an upstream side, and rotated by electromagnetic induction about an axis directed in a flow direction of said polymer dope,
    wherein a surface of said rotor hub is supported by a support disposed within said mixing conduit, and
    a flow opening for passing said polymer dope in said flow direction about said rotor hub is formed in said support.

2. The method as defined in claim 1, wherein said supply conduit has a distribution channel, opposed to said diameter decreasing end in said flow direction, for spreading said liquid additive transversely to said flow direction, to eject said liquid additive into said polymer dope.

3. The method as defined in claim 1, wherein an element for stir constituted by a groove or blade is formed with a peripheral surface of said rotor hub.

4. The method as defined in claim 1, wherein said mixing conduit includes a jacket for maintaining temperature of said polymer dope at a level equal to or lower than a boiling point thereof.

5. The method as defined in claim 1, wherein said rotor hub is constituted by plural rotor hubs arranged serially along said mixing conduit in said flow direction.

6. The method as defined in claim 1, wherein a ratio ηd/ηt of viscosity ηd of said polymer dope to viscosity ηt of said liquid additive is equal to or more than 1 and equal to or less than $1 \times 10^5$.

7. The method as defined in claim 1, wherein a ratio D1/D2 of an outer diameter D1 of said rotor hub to an inner diameter D2 of said mixing conduit is equal to or more than 0.1 and equal to or less than 0.95 as viewed on a plane perpendicular to said flow direction.

8. The method as defined in claim 1, wherein a ratio V1/V2 of a flow speed V1 of said polymer dope to a flow speed V2 of said liquid additive is equal to or more than 1 and equal to or less than 5 on said upstream side from said rotor hub and on a downstream side from said distribution channel.

9. The method as defined in claim 1, wherein a distance between an outlet of said supply conduit and said diameter decreasing end is equal to or more than 1 mm and equal to or less than 200 mm.

10. A mixing method of mixing liquid additive with polymer dope constituted by polymer and solvent, comprising steps of:
    ejecting said liquid additive through a supply conduit into said polymer dope in a mixing conduit; and
    mixing said liquid additive with said polymer dope by use of a rotor hub positioned downstream from said supply conduit, contained in said mixing conduit, having a diameter decreasing end on an upstream side, and rotated by electromagnetic induction about an axis directed in a flow direction of said polymer dope,
    wherein a surface of said rotor hub is supported by a support disposed within said mixing conduit, and
    said rotor hub is driven to rotate at such a peripheral speed V3 as to set a Reynolds value Re higher than 0.02, where said Reynolds value Re is defined by an equation of:

$$Re = \Delta d \cdot V3 \cdot \rho k / \eta k$$

where ηk is viscosity of said polymer dope supplied with said liquid additive;
    ρk is density of said polymer dope;
    Δd is a size of a gap between an inside of said mixing conduit and a peripheral surface of said rotor hub.

11. The method as defined in claim 10, wherein said supply conduit has a distribution channel, opposed to said diameter decreasing end in said flow direction, for spreading said liquid additive transversely to said flow direction, to eject said liquid additive into said polymer dope.

12. The method as defined in claim 10, wherein an element for stir constituted by a groove or blade is formed with a peripheral surface of said rotor hub.

13. The method as defined in claim 10, wherein said mixing conduit includes a jacket for maintaining temperature of said polymer dope at a level equal to or lower than a boiling point thereof.

14. The method as defined in claim 10, wherein said rotor hub is constituted by plural rotor hubs arranged serially along said mixing conduit in said flow direction.

15. The method as defined in claim 10, wherein a ratio ηd/ηt of viscosity ηd of said polymer dope to viscosity qt of said liquid additive is equal to or more than 1 and equal to or less than $1 \times 10^5$.

16. The method as defined in claim 10, wherein a ratio D1/D2 of an outer diameter D1 of said rotor hub to an inner diameter D2 of said mixing conduit is equal to or more than 0.1 and equal to or less than 0.95 as viewed on a plane perpendicular to said flow direction.

17. The method as defined in claim 10, wherein a ratio V1/V2 of a flow speed V1 of said polymer dope to a flow speed V2 of said liquid additive is equal to or more than 1 and equal to or less than 5 on said upstream side from said rotor hub and on a downstream side from said distribution channel.

18. The method as defined in claim 10, wherein a distance between an outlet of said supply conduit and said diameter decreasing end is equal to or more than 1 mm and equal to or less than 200 mm.

* * * * *